United States Patent
Jones et al.

(10) Patent No.: US 6,243,026 B1
(45) Date of Patent: *Jun. 5, 2001

(54) AUTOMATIC DETERMINATION OF TRAFFIC SIGNAL PREEMPTION USING GPS, APPARATUS AND METHOD

(75) Inventors: Gary V. Jones, Bolingbrook, IL (US); Kevin Judge, Palos Verdes Estates, CA (US); James C. Beck, Long Beach, CA (US); Richard Keegan, Torrance, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,693

(22) Filed: Nov. 3, 1999

Related U.S. Application Data

(60) Division of application No. 08/893,232, filed on Jul. 15, 1997, now Pat. No. 5,986,575, which is a continuation-in-part of application No. 08/435,523, filed on May 5, 1995, now Pat. No. 5,926,113.

(51) Int. Cl.[7] .................................................. G08G 1/07
(52) U.S. Cl. ......................... 340/906; 340/907; 340/988; 701/201; 701/213
(58) Field of Search ................................. 340/907, 906, 340/909, 910, 911, 924, 988, 990, 991, 993; 701/201, 202, 207, 208, 213

(56) References Cited

U.S. PATENT DOCUMENTS

| | | | |
|---|---|---|---|
| 4,449,116 | 5/1984 | Hill et al. | 340/909 |
| 5,014,052 | 5/1991 | Obeck | 340/906 |
| 5,083,125 | 1/1992 | Brown et al. | 340/906 |
| 5,452,212 | 9/1995 | Yokoyama et al. | 701/211 |
| 5,539,398 | 7/1996 | Hall et al. | 340/907 |
| 5,926,113 | 7/1999 | Jones et al. | 340/906 |
| 5,986,575 | * 11/1999 | Jones et al. | 340/906 |

FOREIGN PATENT DOCUMENTS

| | | | |
|---|---|---|---|
| WO 94/29827 | 12/1994 | (WO) | G08G/1/123 |
| WO 95/19021 | 7/1995 | (WO) | G08G/1/087 |

\* cited by examiner

Primary Examiner—Van T. Trieu
(74) Attorney, Agent, or Firm—Peter L. Olson

(57) ABSTRACT

For qualification for traffic preemption an area is defined and if the vehicle is in the area it can obtain preemption. The vehicle's position is determined, in one embodiment, by use of differential GPS.

15 Claims, 18 Drawing Sheets

Microfiche Appendix Included
(10 Microfiche, 641 Pages)

APPROACH PROGRAMMING

INTERSECTION : Midwest Traffic Products, Inc. Demo Intersection #123
INTERS. ID    : 123

MAPPING OPTIONS
Approach # : 1
Road Side : Right
Recorder  : Off

SATELLITE INFO
Integrity  :
Statellites :
Hfom       :

INTERSECTION INFO
Latitude  :  41.668759
Longitude : -72.781904

Sectors : 23   Appr's: 5
Sectors : From File

| Appr. | Side  | Points | Low Hfom | High Hfom |
|-------|-------|--------|----------|-----------|
| 1     | right | 47     | 3.50     | 14.40     |
| 2     | right | 40     | 5.00     | 43.80     |
| 3     | left  | 30     | 3.50     | 10.70     |
| 4     | right | 47     | 3.50     | 10.50     |
| 5     | right | 30     | 3.80     | 15.60     |

MESSAGE:

F1-Help                    F4-Transmit Single Appr.         F7-Set Intersection Data
F2-View/Edit Sectors       F5-Clear Approach from file      F8-Transmit Inters. Data
F3-Set Road Side           F6-Clear Approach from Int.      F9-Retrieve Inters. Data

FIG. 13

INTERSECTION DATA          Appr's : 0                    Sect's : 0

| Appr | MINIMUM PREEMPT Time | MINIMUM PREEMPT Dist | STANDING QUE EXTENSION Time | STANDING QUE EXTENSION Dist | STANDING QUE EXTENSION Input | HOLD for NXT VEHICLE Time | HOLD for NXT VEHICLE Dist | DIRECTION TRIP POINT Dist | LOST SIG TIMEOUT Time | INPUT OUTPUT (1-6) |
|---|---|---|---|---|---|---|---|---|---|---|
| 1  | 30 | 820  | 20 | 945 | 0 | 10 | 472 | 656 | 10 | 1 |
| 2  | 20 | 656  | 20 | 945 | 0 | 10 | 472 | 656 | 10 | 2 |
| 3  | 25 | 656  | 20 | 945 | 0 | 10 | 472 | 656 | 10 | 3 |
| 4  | 30 | 820  | 20 | 945 | 0 | 10 | 472 | 472 | 10 | 4 |
| 5  | 30 | 1001 | 20 | 945 | 0 | 10 | 472 | 472 | 10 | 4 |
| 6  | 30 | 1001 | 20 | 945 | 0 | 10 | 472 | 472 | 10 | 0 |
| 7  | 30 | 1001 | 20 | 945 | 0 | 10 | 472 | 472 | 10 | 0 |
| 8  | 30 | 1001 | 20 | 945 | 0 | 10 | 472 | 472 | 10 | 0 |
| 9  | 30 | 1001 | 20 | 945 | 0 | 10 | 472 | 472 | 10 | 0 |
| 10 | 30 | 1001 | 20 | 945 | 0 | 10 | 472 | 472 | 10 | 0 |
| 11 | 30 | 1001 | 20 | 945 | 0 | 10 | 472 | 472 | 10 | 0 |
| 12 | 30 | 1001 | 20 | 945 | 0 | 10 | 472 | 472 | 10 | 0 |

Stop Veh. Timeout [ 30 ]   Veh. over Base [ YES ]   Inters. Id [ 123 ]   Unit of Measure [ FEET ]

F1-Help    F2-Send to Intersection    F3-Toggle Unit of Measure    Esc-Exit

FIG. 14

AUTOMATIC DETERMINATION OF TRAFFIC SIGNAL PREEMPTION USING GPS, APPARATUS AND METHOD

RELATED APPLICATIONS

This application is a division of U.S. application Ser. No. 08/893,232, filed Jul. 15, 1997, (now U.S. Pat. No. 5,986,575), which is a continuation-in-part of patent application Ser. No. 08/435,523 filed on May 5, 1995, (now U.S. Pat. No. 5,926,113), the contents of which are incorporated herein by reference.

Reference to Microfiche Appendix

Appendices 1–4 are submitted herewith on ten (10) sheets of microfiche films in accordance with §1.77 (a) (6) and 36 CRF Part 1230.

FIELD OF THE INVENTION

This invention relates to GPS and traffic preemption.

BACKGROUND OF THE INVENTION

This invention relates generally to control of traffic signals under emergency conditions and, more particularly, to systems for automatic control of traffic signals in such a way as to preempt normal signal operation and permit the unimpeded and safe passage of emergency vehicles, such as ambulances, police cars, fire trucks and so forth. Without preemption, drivers of emergency vehicles often find themselves stuck in congested traffic or are forced into dangerous traffic maneuvers. These include entering opposing traffic lanes and running red lights. The latter is particularly dangerous, since a motorist who has the green may not see the approaching emergency vehicle until it is too late. There is a related need for preemption control systems to give priority to non-emergency vehicles, such as buses, which have to maintain a schedule in busy traffic. It has been widely accepted that, particularly in high density traffic areas, there is a vital need for such systems. Not only must an emergency vehicle be free to move through an intersection in a selected direction of travel, but the traffic flow in other directions, which could interfere with the movement of the emergency vehicle, must be stopped by an appropriate signal indication until the emergency vehicle has passed.

A number of present day systems have been utilized to accomplish this general purpose, but all have fallen short of the desired result in some respect. A common approach has been to provide apparatus on the emergency vehicle to transmit an emergency signal to a receiver associated with the traffic signal. The traffic signal controller, which has been suitably modified, is actuated to operate the signals in a predetermined emergency sequence. Some systems of this type require the installation of a receiver or sensor under the road surface, to detect where the vehicle is located with respect to the traffic signals. Obviously, systems of this type present difficulties of installation and maintenance. Various traffic preemption systems use radio signals, infrared signals, ultrasonic signals, audio signals or optical signals transmitted from the emergency vehicle and detected in some manner at the controlled intersection. A common difficulty with all systems of the prior art is that of accurately determining the time of arrival of the vehicle at the intersection. Clearly, preemption of normal traffic control should not occur too early. Apart from the obvious inefficiency this entails, there is an element of risk in that impatient drivers may try to enter a controlled intersection before the emergency vehicle arrives. Various techniques have been proposed for determining vehicle location and estimating arrival time. For example, electronic "signposts" can be installed beside or beneath the roadway to detect the passage of vehicles. Such systems are used, for example, to determine the locations and predicted arrival times of buses and to help maintain more accurate bus schedules. For the traffic preemption problem, however, installing multiple sensors or "signposts" near each intersection would be very expensive and still would not necessarily provide the desired accuracy.

More specifically, optical preemption systems are limited by the line of sight between the vehicle and the intersection control unit. Audio preemption systems detect the sound of an approaching siren on an emergency vehicle and take appropriate action. Unfortunately, the sound can be blocked by other vehicles or buildings, and microphones must be installed at points approaching the intersection.

Radio preemption systems currently available utilize signal strength to determine distance from the intersection. However, natural variations in terrain and man-made obstructions render this approach quite inaccurate.

Beacon based systems are more accurate, but do not permit subsequent adjustment to preemption distance needed for changing traffic patterns or construction zones. Also the installation cost of a beacon system is high because long lengths of underground cable has to be installed beneath the intersection and its approaches. Sensor loops underground are used to sense the vehicle positions, but are prone to breakage in cold weather. A failed sensor can render the system inoperative while repairs are made over an extended period, possibly months.

Another common aspect of traffic signal preemption systems is that they are typically manually actuated from the emergency vehicle. When the driver actuates a button or switch in the vehicle, an emergency signal is transmitted to the controller at the intersection, to preempt normal operation and modify the controller temporarily for passage of the vehicle. Some systems allow the driver to indicate a direction of turn at the intersection, so that the traffic signals can be appropriately controlled during preemption. However, existing preemption systems are typically not optimized to disrupt normal traffic control for as short a time as possible, or to clear as much of the interfering traffic as possible from the intersection. Moreover, existing preemption systems have no provision for preempting signals at adjacent intersections to one side or the other of the vehicle direction of travel when a preemption request is made. In existing systems, some intersections may not be preempted soon enough, if the vehicle deviates from a straight path along a single street, and may be preempted unnecessarily if the vehicle turns before reaching a nearby preempted intersection. The present invention has the goal of providing safe and unobstructed passage for emergency vehicles, while at the same time minimizing disruption of normal traffic through the intersection, and eliminating many of the disadvantages of the prior art systems.

SUMMARY OF THE INVENTION

The present invention resides in a traffic signal preemption system using differential global positioning system (GPS) measurements, and a related method of operation of the system. The present traffic preemption system and method provides green traffic signals to emergency vehicles while minimizing disruption of normal traffic flow. This provides the basic goal of facilitating travel of emergency vehicles, while reducing the undesirable effects. It will save lives and property in fewer traffic accidents and in reduced legal liability.

The system and method works in all weather and reliably handles complex road networks, including closely spaced intersections, curves and corners.

The system and method uses GPS to determine vehicle position, direction of travel, speed and time of day.

Also, the present system and method keeps preemption in effect for a minimized period so that a motorist who is held at a lengthened red light will not conclude that the lights are faulty or become impatient and run the red light.

In the present system and method, a single vehicle can preempt a whole series of intersections, so that the driver sees nothing but green lights along the emergency route. This includes curved roads, sharp turns, intersections with "dog-ear" approaches, and complex road networks which do not follow any kind of grid. Each signal is preempted at the optimum time depending on vehicle speed, with preemption occurring sooner (at a greater distance) as speed increases. Signals can also be preempted around comers, since the preemption system and method will respond to turn signals of emergency vehicles.

Briefly, and in general terms, the system of the invention includes a traffic signal subsystem and a vehicle subsystem. The traffic signal subsystem includes a GPS reference receiver having an antenna installed at a known position, for receiving GPS signals and computing measurement corrections for the GPS signals, a traffic signal controller capable of operation in a normal mode, and in a preemption mode when an emergency vehicle approaches the intersection, a communication radio for receiving data from an approaching emergency or other vehicle, and an intersection computer, containing a model of the intersection and used for processing received signals indicative of vehicle position, speed and direction. The intersection computer uses the received data to determine when to switch the traffic signal controller to and from preemption mode. The intersection computer is interfaced to the controller in the traffic cabinet, and provides signals to the controller which takes appropriate action in response. Actual traffic control continues to be monitored by the existing conflict monitor unit (CMU) to assure traffic safety. The vehicle subsystem includes a mobile GPS receiver for receiving GPS signals, a communication radio for transmitting data to the traffic signal subsystem radio, and a vehicle computer, for coordinating operation of the vehicle GPS receiver and the vehicle communication radio. As presented to the vehicle operator there is a small operator interface panel, and two antennae. It is powered by the 12 volt vehicle battery. The system is turned on by an on-off switch. Corrected vehicle position, speed and direction measurements sent from the vehicle are used by the intersection computer to determine when to switch the traffic signal controller to and from preemption mode in such a way as to minimize disruption of normal traffic.

In one embodiment of the system the GPS measurement corrections computed by the intersection computer are transmitted to the vehicle and the vehicle computer computes corrected measurements of vehicle position, speed and direction for transmission back to the traffic signal subsystem.

In the preferred system a 12-channel GPS receiver is installed at the intersections and on equipped vehicles. Each intersection serves as a GPS reference station. It transmits differential corrections via two-way radio to the approaching vehicle. The result is a Differential GPS (DGPS) with a typical accuracy of 5 meters, without the monthly costs associated with a commercial DGPS service.

Use of DGPS allows preemption zones to be defined with great accuracy, and the system allows operator set-up flexibility to eliminate false preemption. A preemption call to the controller can be precisely timed to minimize disturbance of the traffic control system.

The decision of when to issue a preemption call is made by the intersection preemption module based on the estimated time of arrival (ETA) of the vehicle. The ETA is calculated in real time based on the vehicle's location and speed, as derived from the corrected GPS data from the vehicle. Approach track data is first installed by making a setup run for each approach. Approaches can be curved or overlapping.

In a preferred embodiment of the invention there is a vehicle subsystem which has a GPS receiver, a computer, a radio receiver and a radio transmitter, and an intersection subsystem which has a GPS reference station, a radio transmitter, a radio receiver, a computer and a traffic controller. In operation the intersection subsystem will broadcast GPS pseudorange correction terms which will be received by a vehicle. the vehicle subsystem will apply the correction terms to received GPS data and transmit corrected GPS information which will be received by the intersection subsystem.

The approach being used will have a pre-programmed track composed of one or more sectors. Also there will be a designated programmed time of arrival for the approach which is a time period. Using the GPS information received from the vehicle, the intersection computer will determine the vehicle's time of arrival period at the intersection. The vehicle sends its data periodically such as every second, and the intersection computer determines the vehicle's time of arrival each time. When the vehicles' time of arrival has a specified relationship to the programmed time of arrival, such as equal to or less than, then preemption will be ordered by a signal to the intersection controller.

In another embodiment the vehicle communication radio transmits uncorrected vehicle position speed and direction measurements to the traffic signal subsystem and the intersection computer computes corrected vehicle position speed and direction measurements. In yet another embodiment the vehicle communication radio transmits raw GPS measurements to the traffic signal subsystem and the intersection computer computes uncorrected and corrected vehicle position speed and direction measurements. In still another embodiment a single GPS reference receiver serves multiple controlled traffic intersections and broadcasts GPS measurement corrections to multiple vehicles in the same vicinity. The vehicle computer in each vehicle computes corrected measurements of vehicle position speed and direction for transmission to the traffic signal subsystem.

Preferably the vehicle subsystem includes a turn signal indicator wherein the vehicle communication radio also transmits turn signal and vehicle identification information to the traffic signal subsystem and to other adjacent intersection subsystems. An adjacent intersection in the path of a turning vehicle can issue a preemption output earlier than if it had waited for the vehicle to approach in the normal way thereby allowing traffic in the adjacent intersection to be cleared soon enough for the vehicle's arrival. Moreover nearby intersections that are not on the vehicle's path can ignore preemption requests received from vehicles that are about to turn from their current path.

The traffic signal preemption system may also be operated in a "learn" mode in which a manually operated switch in the vehicle is actuated at a selected points on each approach route to the intersection; and the traffic signal subsystem includes means for operating in the learn mode during which each approach route to the intersection is recorded for later use in a normal mode of operation.

In accordance with the method of the invention, the preemption system performs the steps of receiving global positioning system (GPS) signals at a reference GPS receiver whose location is accurately known; computing differential position corrections to be applied to the position measurements derived from the received GPS signals; receiving GPS signals at a vehicle GPS receiver; transmitting some form of the received vehicle GPS signals to a traffic signal intersection subsystem; computing corrected measurements of vehicle position, speed and direction; and computing from the vehicle position, speed and direction measurements, taken with known intersection approach data, an optimum time or position for switching to a preemption mode of traffic control.

One embodiment of the method further includes the step of transmitting position corrections to each vehicle. In this embodiment the step of computing corrected measurements is performed in the vehicle; and the step of transmitting some form of received vehicle GPS signals transmits corrected vehicle position, speed and direction measurements.

In another embodiment of the method, the step of computing corrected measurements is performed in the traffic signal intersection subsystem; and the step of transmitting some form of received vehicle GPS signals transmits uncorrected vehicle position, speed and direction measurements.

In yet another embodiment of the method, the step of computing corrected measurements is performed in the traffic signal intersection subsystem; and the step of transmitting some form of received vehicle GPS signals transmits raw GPS measurements obtained in the vehicle.

Preferably, the method also includes the step of transmitting from the vehicle to the traffic signal intersection subsystem additional data including vehicle identification information and vehicle turn signal information.

In accordance with another aspect of the invention, the method further comprises the step of determining in the reference GPS receiver an accurate position of the receiver, by averaging position measurements taken periodically over a long time interval. In accordance with yet another aspect of the invention, the method further comprises the step of operating the system in a learn-mode, including switching the system to learn mode, driving the vehicle over each approach route to the intersection, mapping the approach routes to the intersection for use in normal operation, actuating a switch in the vehicle at a vehicle position in which preemption of the traffic signal is desired, and recording the desired position of preemption for later use in normal operation.

In accordance with another aspect, the learn-mode uses the positions found in driving the route to create contiguous sectors which define portions of the approach. Lateral segments of the sectors are operator variable to ensure that desired ground area is included and undesired ground area is excluded for qualification for preemption. To qualify for preemption a vehicle must be in an approach as defined by the sectors. Then, for further qualification, the vehicle must be heading toward the intersection. Then, for further qualification, the vehicles calculated time of arrival at the intersection must have a specified (such as equal to or less than) relationship to a predetermined time of arrival for that approach.

It will be appreciated from the foregoing summary that the present invention represents a significant advance in the field of traffic signal preemption systems. In particular, the invention provides extremely accurate data defining an approaching vehicle's position, speed and direction, which data can be used in a variety of preemption algorithms to minimize disruption of normal traffic. The system of the invention may also be operated in a "self-survey" mode to provide accurate position data for a reference GPS receiver used by the system, and in a "learn" mode to record parameters relating to each approach route to an intersection. Other aspects and advantages of the invention will become apparent from the following more Detailed description, taken in conjunction with the accompanying drawings.

BRIEF DESCRIPTION OF THE DRAWINGS

FIG. 13 is a reproduction of an Approach Programming screen of the MTPUTIL program.

FIG. 14 is a reproduction of an Intersection Data screen of the MTPUTIL program.

DESCRIPTION OF THE PREFERRED EMBODIMENTS

Figure 1:
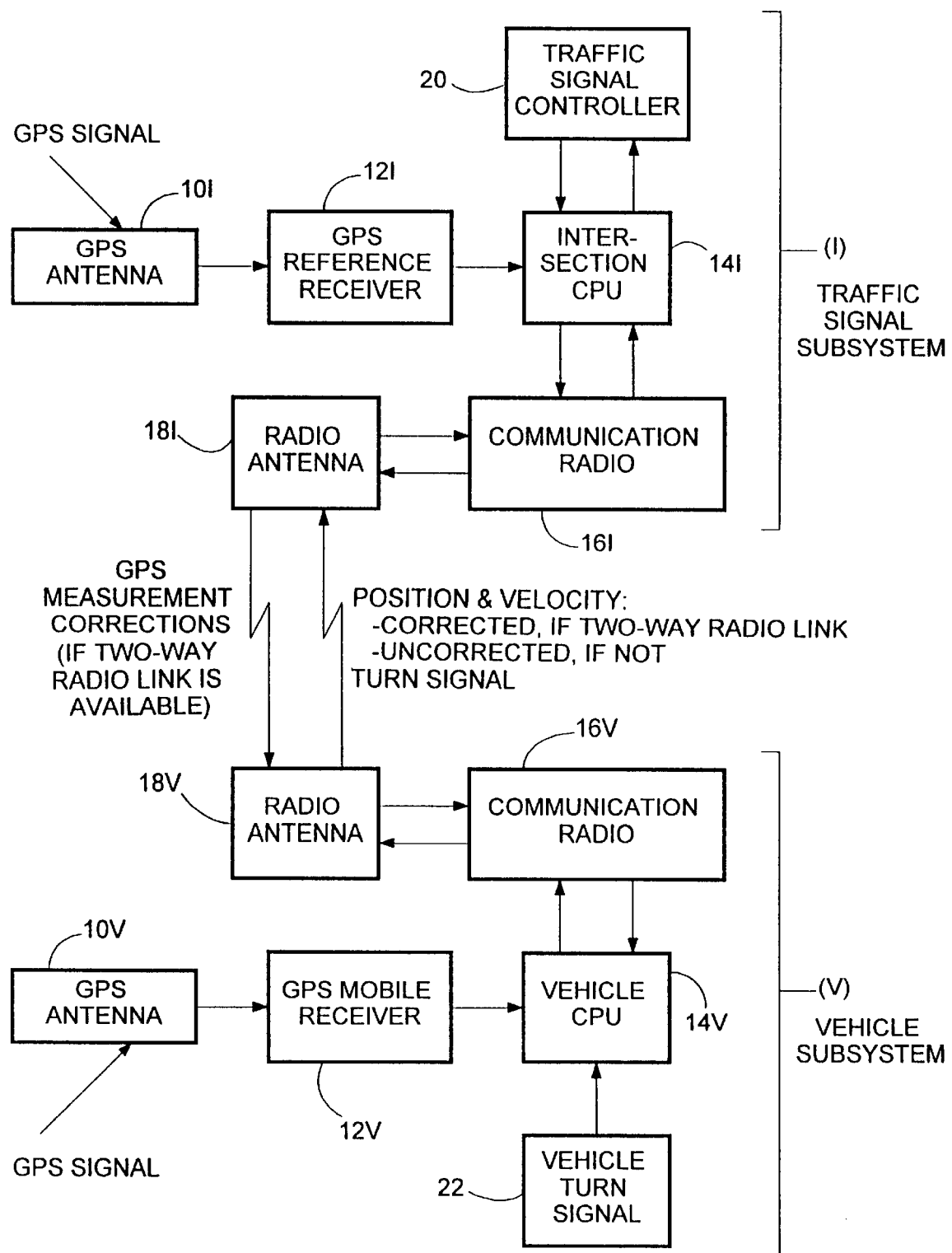
FIG. 1 is a block diagram of a traffic signal preemption system in accordance with the present invention.

As shown in the drawings for purposes of illustration, the present invention is concerned with a traffic signal preemption system, which preempts normal traffic control for emergency vehicles and other vehicles, such as buses, but minimizes disruption of normal traffic. A number of embodiments of the invention are described below, but all make use of a technique known as differential GPS (differential global positioning system) to measure the position, direction and speed of an emergency vehicle relative to a controlled traffic signal.

Briefly, by way of further background, the global positioning system (GPS) is a system of multiple orbiting satellites that transmit radio signals of a known format. A GPS receiver on or near the earth's surface receives signals from multiple GPS satellites simultaneously and computes the position of the receiver in three-dimensional space, using well known signal processing techniques. GPS was originally intended as a military navigation tool and permits vehicles to obtain their latitude, longitude and altitude accurately. The basis for these calculations is the measurement of the distance or range between the receiver and each of several uniquely identifiable satellites from which transmissions are received. These range values are referred to as "pseudorange" measurements. They are subject to a timing or clock bias error because the receiver is not necessarily synchronized with the satellite transmitters. From the pseudorange measurements for at least four visible satellites, and a knowledge of the orbital positions of the satellites, referred to as ephemeris data, which is also transmitted from each satellite, the position of the receiver is calculated and the clock bias error is eliminated. The accuracy of GPS for commercial purposes is deliberately limited by government control of the satellite signals. For many commercial applications, such as navigation on the open sea, position determination to an accuracy of a hundred meters or so is more than sufficient. Increased positional accuracy for other commercial purposes can be obtained using a technique known as differential GPS (DGPS). In DGPS, an additional GPS receiver, called the reference receiver, is installed at a fixed location and its position is determined to a high degree of accuracy using any available means. Since the reference receiver already "knows" its position, it can determine any error in a position as determined from currently received GPS signals. The amount of the error can then be transmitted to one or more nearby mobile GPS receivers, which can correct their GPS-determined positions. An assumption is usually made that the errors in GPS-determined position are the same for all receivers that are relatively close together. Using DGPS, positions of mobile GPS receivers can be determined to almost the same accuracy as that of the known position of the reference receiver. DGPS is used, for example, for marine navigation close to shore, with the reference receiver being located on land near the coastline.

FIG. 1 illustrates how the principle of DGPS is applied in a traffic signal preemption system. The apparatus includes a traffic signal subsystem located at a street intersection, indicated generally by reference character I, and a vehicle subsystem V. Since each of the subsystems I and V include similar components, they will be referred to by the same reference numerals, with the suffix I or V. The traffic signal subsystem has a GPS antenna 10I, a GPS receiver 12I, which is the reference receiver, a computer or central processing unit (CPU) 14I, a communication radio 16I and an associated radio antenna 18I. Similarly, the vehicle subsystem includes a GPS antenna 10V, a GPS receiver 12V (the mobile receiver), a computer CPU 14V, a communication radio 16V and a radio antenna 18V. The traffic signal subsystem also includes a conventional traffic signal control unit 20 coupled to the CPU 14I, such that the computer can both monitor the status of the control unit and, to a limited degree, control or modify the control unit to operate in a preemption mode or various specific preemption modes. The vehicle computer 14V receives input from the vehicle turn signal, as indicated at 22, and is thus made aware of the intended direction of turn of the vehicle as it approaches an intersection.

The intersection CPU 14I performs two principal functions:

(1) The intersection CPU will use the GPS reference receiver measurements together with the known antenna location to compute an estimate of the local receiver clock time. Then, after removing any clock bias from the pseudorange code measurements, the CPU will compute a correction value which would cause each of the pseudorange measurements to represent accurately the distance between the satellite and the reference GPS antenna 10I. The pseudorange correction values are then passed on to the communication radio 16I for transmission to participating vehicles in the vicinity.

(2) The differentially corrected GPS position, together with the direction and speed of the vehicle is received back from the vehicle subsystem, through the radio communication link, and transferred to the intersection CPU 14I. Included with this information will be the status of the vehicle turn signal indicator. The received information, together with the status of the traffic signal control unit 20, is used to generate a preemption control signal to the traffic signal control unit and a command as to the desired state of the traffic signal.

The functions of the vehicle subsystem are generally complementary to those of the intersection subsystem. The GPS antenna and receiver in the vehicle supply the GPS measurements and satellite position information to the vehicle CPU 14V. The communication radio 16V and associated antenna 18V receive the measurement corrections transmitted from the reference subsystem, and transmit back the computed position, direction and speed of the vehicle, together with the status of the vehicle turn signal. The task of the vehicle CPU 14V is to use the GPS measurement and orbit information together with the measurement corrections received from the reference receiver in the intersection subsystem, to compute an accurate position and speed of the vehicle, along with its direction of travel. When the position, direction and speed data are computed, they are passed to the communication radio, together with the turn signal status, security codes and other pertinent information, for transmission to the traffic signal reference subsystem at the intersection.

As described thus far, the system of the invention utilizes a two-way communication link between the vehicle and the traffic signal subsystem. The traffic signal subsystem transmits GPS measurement corrections to the vehicle, and the vehicle transmits back to the traffic signal subsystem the corrected position, speed and direction, as well as turn signal, vehicle identification and other pertinent information. Various other configurations are possible and within the scope of the invention, as summarized in the following table.

| Configuration | Data transmitted TO vehicle | Data transmitted FROM vehicle | Remarks |
|---|---|---|---|
| (A) Two-way radio link. | GPS measurement corrections, either: | Corrected GPS position, speed & | Corrections made in vehicle CPU |

-continued

| Configuration | Data transmitted TO vehicle | Data transmitted FROM vehicle | Remarks |
|---|---|---|---|
| | (1) GPS pseudo-range coreections, (2) GPS position corrections. | direction; turn signal; vehicle id., etc. | and transmitted to intersection CPU. |
| (B) One-way radio link. | None. | Uncorrected GPS position, speed and direction; turn signal; vehicle id., etc. | Corrections made in intereection CPU. |
| (C) One-way radio link. | None. | Raw GPS measurements; turn signal; vehicle id., etc. | Corrections made in intersection CPU. |
| (D) Separate one-way radio links. | GPS measurement corrections broadcast to all vehicles in area; either: (1) GPS pseudo-range corrections, (2) GPS position corrections. | Corrected GPS position, speed & direction; turn signal; vehicle id., etc. | Corrections made in vehicle CPU and tnansrnitted to intersection CPU. |

Configuration (A)(1) is the one described above, using a two-way radio communication link. Configuration (A)(2) is similar except that the intersection CPU computes corrections in measured position, rather than corrections in the raw GPS pseudoranges. The vehicle CPU then uses the position corrections to compute corrected position, speed and direction data for transmission to the intersection.

In configuration (B), the vehicle computes its position, speed and direction from received GPS signals and transmits this uncorrected data to the intersection CPU over a one-way radio link. As in the other configurations, the turn signal indicator is also transmitted, together with vehicle identification, security, and other information. The intersection CPU corrects the position, speed and direction data for the vehicle and performs the necessary traffic signal control functions. Nothing is transmitted back to the vehicle.

Configuration (C) also uses a one-way radio communication link, but the vehicle CPU in this case does not compute its position, speed and direction. Instead, raw GPS measurements are transmitted to the intersection CPU, which computes the vehicle position, speed and direction, and then applies corrections based on its own GPS measurements and known position. Again, nothing is transmitted back to the vehicle.

Configuration (D) is similar to the two-way radio communication link of configuration (A), except that there is no requirement that a GPS reference receiver be located at every controlled intersection. Instead, a single reference receiver could be used for an extended geographical area, which may be as large as an entire city for some installations. The GPS measurement corrections, either pseudorange corrections (configuration (D)(1)) or position corrections (configuration (D)(2)), are broadcast to all of the vehicles in the area covered by the reference receiver. Each vehicle has a one-way radio communication link with each controlled intersection, and transmits corrected position, speed and direction measurements to the intersection.

With regard to the two options, (1) and (2), for transmitting corrections to the vehicle, the first option, transmitting pseudorange corrections, is generally preferred because then the vehicle can make use of the corrections even if the same satellites are not being tracked. The other option of transmitting position corrections requires less data to be transmitted, but requires in addition some means for ensuring that the same satellites are being tracked.

Self-Survey Mode:

As discussed above, differential GPS depends on accurate knowledge of a reference GPS receiver antenna. This requirement can be met by making a survey of the reference location and determining its position with respect to a local survey datum point. However, the required accuracy for the location of the reference antenna in the traffic preemption system can be met quite easily using the reference GPS receiver in a self-survey mode. Self-survey means the use of the GPS reference receiver to make an accurate determination of its own position. One way of doing this is to capture the result of GPS position determination periodically over an extended period, e.g., every five minutes over one or two days. A common source of position errors is multipath effects, whereby a signal transmitted from a satellite to a receiver takes an undesired alternate path due to reflections from geographical or man-made objects. Because each satellite is a moving transmission source, the multipath effects vary with time, but only relatively slowly. Multipath errors are said to be strongly correlated with time, and there is little benefit to averaging measurements taken at closely spaced intervals because the errors are not changing rapidly enough. Sampling position measurements every five minutes or so involves far less computation and data, and the averaged position is almost as accurate as if measurements had been taken every second. Errors due to multipath effects are virtually eliminated if the position measurements are averaged over a long observation period. In most cases, it should be possible to determine the reference antenna position to an accuracy of a few meters, which is more than adequate for the traffic signal preemption application. Another approach for averaging the position measurements over an extended period is to modify a standard GPS receiver to use a different statistical data filtering technique. GPS receivers typically employ a Kalman filter that is implemented to provide independent position measurements at each GPS time epoch. The Kalman filter can be modified to directly combine successive measurements to obtain a best average position solution. This involves changing the filter such that the position states are not propagated in time. Instead, all measurements are processed to arrive at the single best position that fits all the data. An equivalent alternative to this stationary Kalman filter implementation is a Least Squares solution which incorporates all measurement data into a single best solution.

From a cost standpoint, any of these methods is probably preferable to performing a survey to determine the location of the GPS reference antenna. Averaging measurements over a day or two costs virtually nothing, and the statistical methods that require a modified receiver can be implemented by modifying a single receiver and temporarily installing it at each reference receiver site to determine the position with accuracy.

Learn Mode:

Another innovative feature of the invention is its ability to operate in a "learn" mode in which a vehicle equipped with a differential GPS receiver is driven over all routes that approach the controlled traffic signal. While driving these approach routes, an operator button or other indicator in the vehicle is used to indicate the appropriate distance, which can be a mean distance or a maximum and minimum distance, at which the approaching vehicle should cause preemption of the traffic signal. In the learn mode, frequent samples of the approaching vehicle position, as transmitted to the intersection receiver site, will be sampled, stored and subsequently processed to define the possible approach paths to the traffic signal. The learn mode will allow the same path to be traversed a number of times, if necessary, to smooth out errors due to either positioning noise or small variations in the path followed by the vehicle. The learn mode should only be necessary to define intersections with unusual or curved approach paths. Most intersections can be defined by standard intersection models. The data obtained during learn mode is processed to provide a mathematical description of each approach path. For curved paths, a mathematical approximation may be required to match the observed approach path data.

Figure 2:
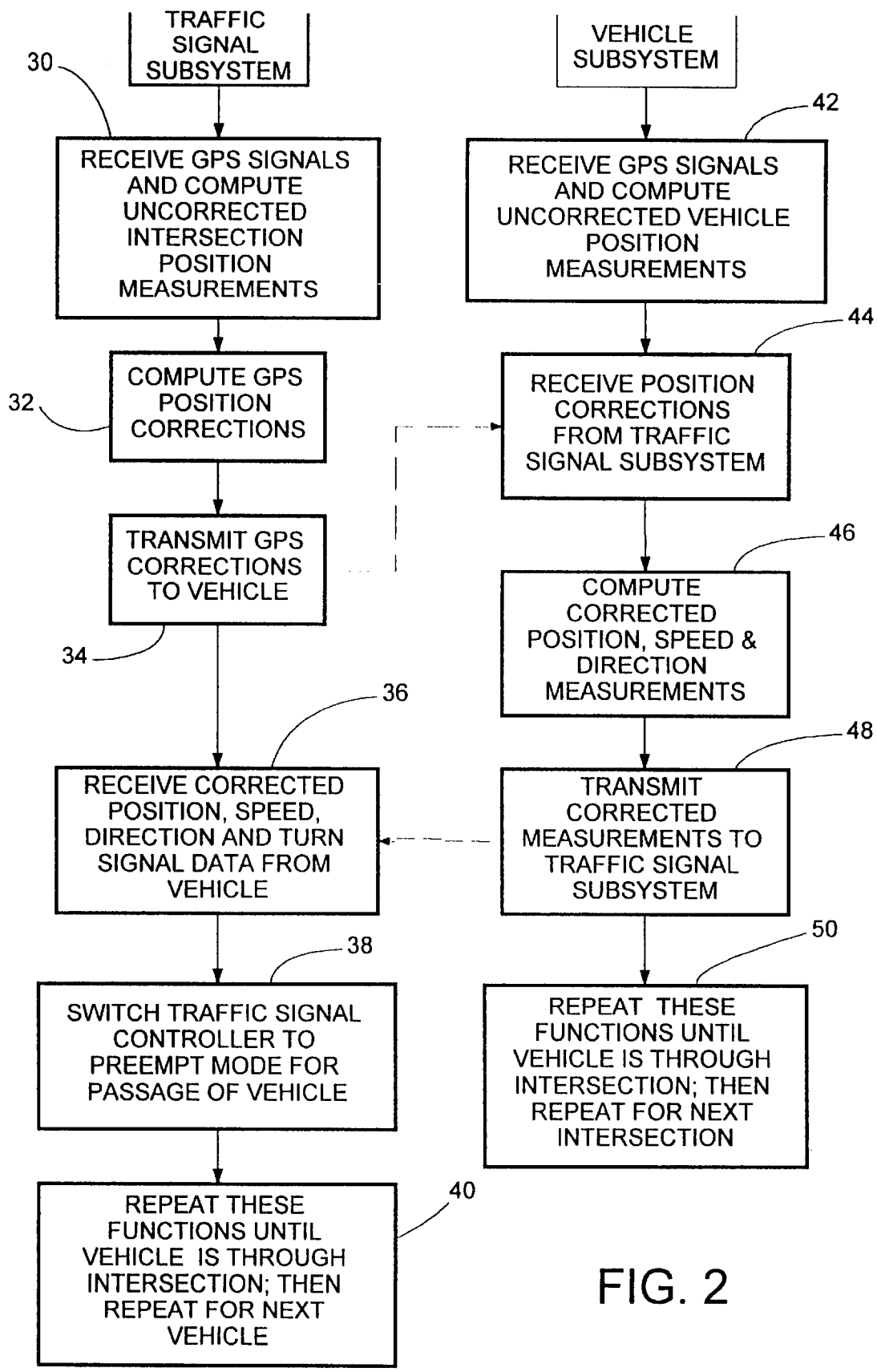
FIG. 2 is a flowchart depicting functions performed by the traffic signal preemption system of FIG. 1.

Basic Sequence of Operations:

FIG. 2 shows the basic functions performed by the traffic signal subsystem and the vehicle subsystem. The traffic signal subsystem receives GPS signals from multiple satellites and first computes uncorrected position measurements indicative of the uncorrected position of the GPS reference receiver antenna. This function is indicated in block 30. It will be understood that, although the flowchart of FIG. 2 implies a sequence of operations, some of the described functions may be performed on a continuous basis in parallel with other functions. As indicated in block 32, the position measurement corrections are computed from the uncorrected measurements and a knowledge of the actual position of the reference receiver antenna.

As shown in block 34, the position measurement corrections are transmitted to the vehicle, or all vehicles in the vicinity. FIG. 2 depicts the two-way radio communication embodiment of the invention, referred to earlier as configuration A. It will be understood, of course, that the corrections may not necessarily be transmitted to the vehicles, but may be applied to uncorrected data transmitted from the vehicle. It will also be understood that the modifications to FIG. 2 to operate as configurations B, C or D may be easily made.

As shown in block 36, the traffic signal subsystem next receives corrected data back from the vehicle, indicative of vehicle position, speed and direction. Using this received data, together with previously stored data defining the approach routes to the intersection, the traffic signal subsystem determines when to switch the traffic controller to preemption mode and back into normal mode, as indicated in block 38 and further deemed in FIG. 3. The functions described above are performed repeatedly while the vehicle is approaching and passing through the intersection. Once the vehicle is safely through the intersection and the controller is back in normal mode, the traffic signal subsystem has competed its task, which is repeated for other vehicles approaching the intersection, as indicated in block 40.

The vehicle subsystem, as also shown in FIG. 2, receives GPS signals in its own mobile GPS receiver and computes uncorrected position data, as indicated in block 42. The vehicle then receives position measurement corrections from the traffic signal subsystem, as indicated in block 44, and computes corrected measures of position, speed and direction, as indicated in block 46. These corrected values are then transmitted back to the traffic signal subsystem, as indicated in block 48. The vehicle subsystem functions are performed repeatedly until the vehicle is through the intersection, and repeated again for other intersections, as indicated in block 50.

Figure 3:
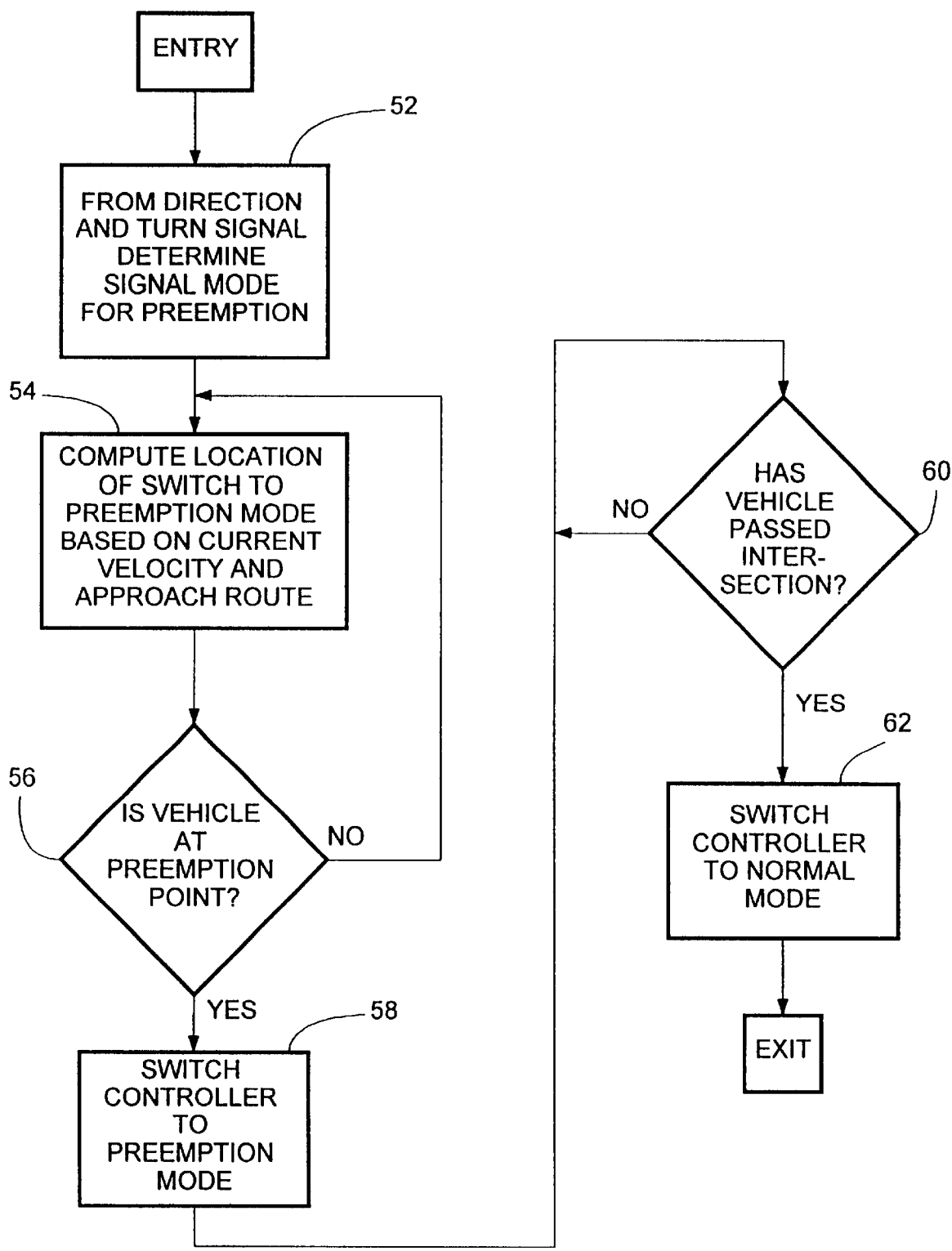
FIG. 3 is a flowchart depicting the functions performed by the intersection computer in controlling switching between normal mode and preemption mode of operation of the traffic signal controller.

Basic Traffic Control Functions:

The function described broadly in block 38 of FIG. 2 is shown in more Detail in FIG. 3. It will be understood, however, that the invention is not limited to a specific traffic signal preemption algorithm and any of a number of different approaches may be used to determine when and how to preempt the traffic signals based on the information derived from the approaching emergency vehicle. The first broad step, shown in block 52, is to determine from the vehicle position and direction data the specific preemption mode that will be used. The vehicle turn signal is also used in this determination. From these data components, the vehicle's intended path through the intersection is determined and appropriate steps are taken to prepare for a switch to the preemption mode. In a simple case, normal operation may continue until the switch is made.

In a more complex preemption technique, the vehicle approach time may be used to clear the intersection in an appropriate manner. When the vehicle is signaling an intended direction of turn at the intersection, preemption may involve multiple intersections, as discussed in a separate descriptive section below.

As shown in block 54, the next step is to compute an estimated position (on the vehicle approach route) at which switching to preemption mode should most desirably take place. Basically, the selection is made as a function of the measured vehicle speed, and the known distance to the intersection, allowance being made for an appropriate time of operation in preemption mode before the vehicle enters the intersection. Next, as indicated in decision block 56, the vehicle's current position is compared with the estimated "preemption point" on the approach route. If the preemption point has not yet been reached, the preemption point is recomputed, in block 54, based on more current position and speed data, and the vehicle's position is again compared with the preemption point position. When the preemption point is reached, the traffic controller is switched to preemption mode, as indicated in block 58. Then the vehicle position is monitored to determine when the vehicle has passed through the intersection, as indicated in decision block 60. When this occurs, the traffic controller is switched back to normal operation mode, as indicated in block 62, and the preemption task is complete.

Figure 4:
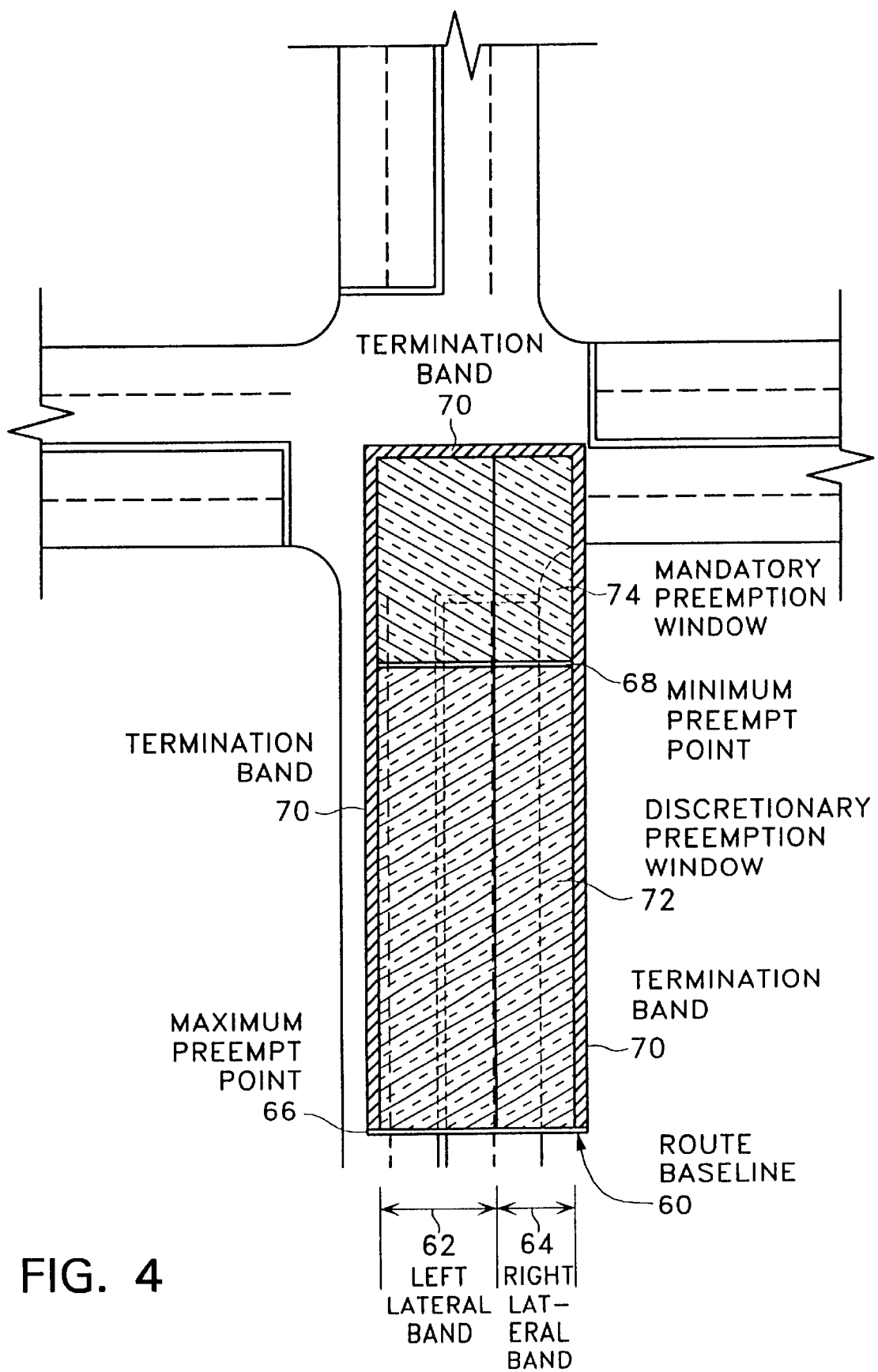
FIG. 4 is a plan view of an intersection, labeled to indicate various terms used to describe a vehicle route through the intersection.

More Detailed Example of Preemption Control:

To understand how the traffic signal subsystem operates requires the introduction of some terminology defining the geometry of an intersection, as shown in FIG. 4 for a simple right-angle intersection. Each approach route to the intersection may be unique, but the four routes will be practically identical in the symmetrical intersection illustrated in FIG. 4. The elements of each include:

The "route baseline" 60 comprises a number of GPS coordinates sufficient to define the basic route of travel required to traverse the intersection in a given direction.

The "left lateral band" 62 is a band running parallel to the route baseline on its left side, as viewed from a vehicle following the route baseline, and defining the left boundary of the route.

The "right lateral band" 64 serves the same purpose as the left lateral band, but on the opposite side of the route baseline.

The "maximum preempt point" 66 is a line defining the furthest distance from the intersection at which a preemption output will be allowed to be activated.

The "minimum preempt point" 68 is a line defining the nearest distance from the intersection at which a preemption output must be activated.

The "termination band" 70 is a band defining the outer edges of the preemptive route through the intersection, along the left, right and front edges. Any vehicle that has been granted a preemption output based on passage through either or both "preemption windows" (defined below), shall have its preemption output terminated upon passage through the termination band.

The "discretionary preemption window" 72 is that portion of the route extending from the maximum preempt point line at the rear to the minimum preempt point line at the front, and from the left lateral band to the right lateral band. A vehicle entering this window and requesting a preempt shall be granted the request provided there are no other requests of equal or higher priority being serviced. The exact point within the window where the preemption is granted is determined by a calculation of the time required by the vehicle to reach the intersection at its current speed and the time required by the traffic signal controller to clear the intersection.

The "mandatory preemption window" 74 is that portion of the route extending from the minimum preempt point line at the rear to the termination band at the front, left and right sides. Any vehicle entering this window and requesting a preempt shall be granted an immediate preempt output provide that no other requests of equal of higher priority are already being serviced.

In the description that follows, it should be understood that preemption of the normal traffic signal operation may be requested from two types of sources, which are designated priority-1 requests and priority-2 requests. Priority-1 requests are from emergency vehicles, such as fire trucks, ambulances and police vehicles. Priority-1 requests may also be received from base stations, such as fire or police stations located near an intersection. As will be explained, these two types of priority-1 requests are treated differently in some respects. Priority-2 requests come from public service vehicles, such as buses or garbage trucks, which must maintain schedules as closely as possible, but which do not have priority over emergency vehicles. Another aspect of handling priority-2 requests from buses is that a bus may also request "queue jumping" wherein the bus gets an early green signal when stopped in a bus lane at the intersection.

Figure 5A:
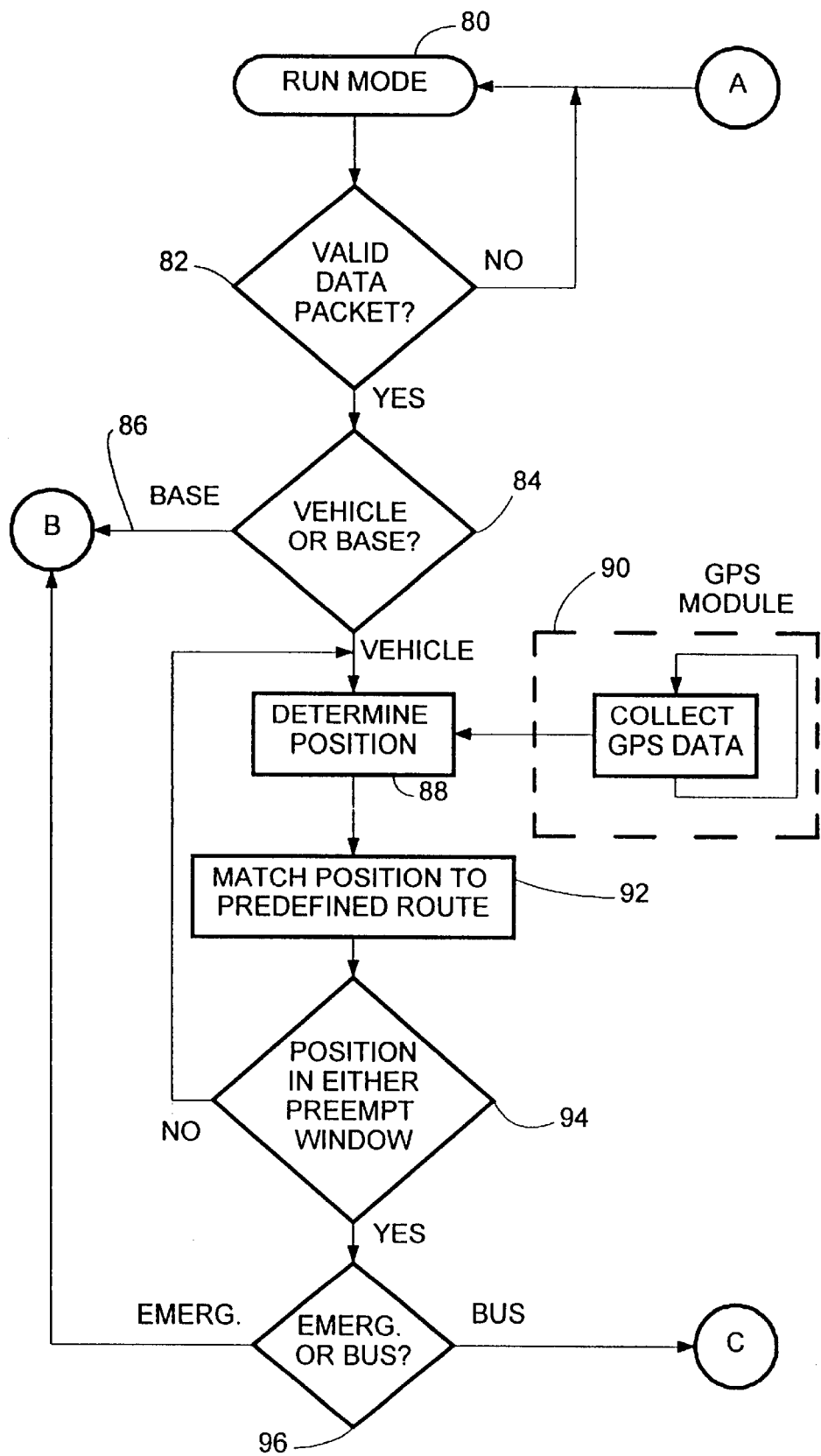
FIG. 5 is a flow diagram showing the functions performed by the intersection computer in its "run" mode.
Figure 5B:
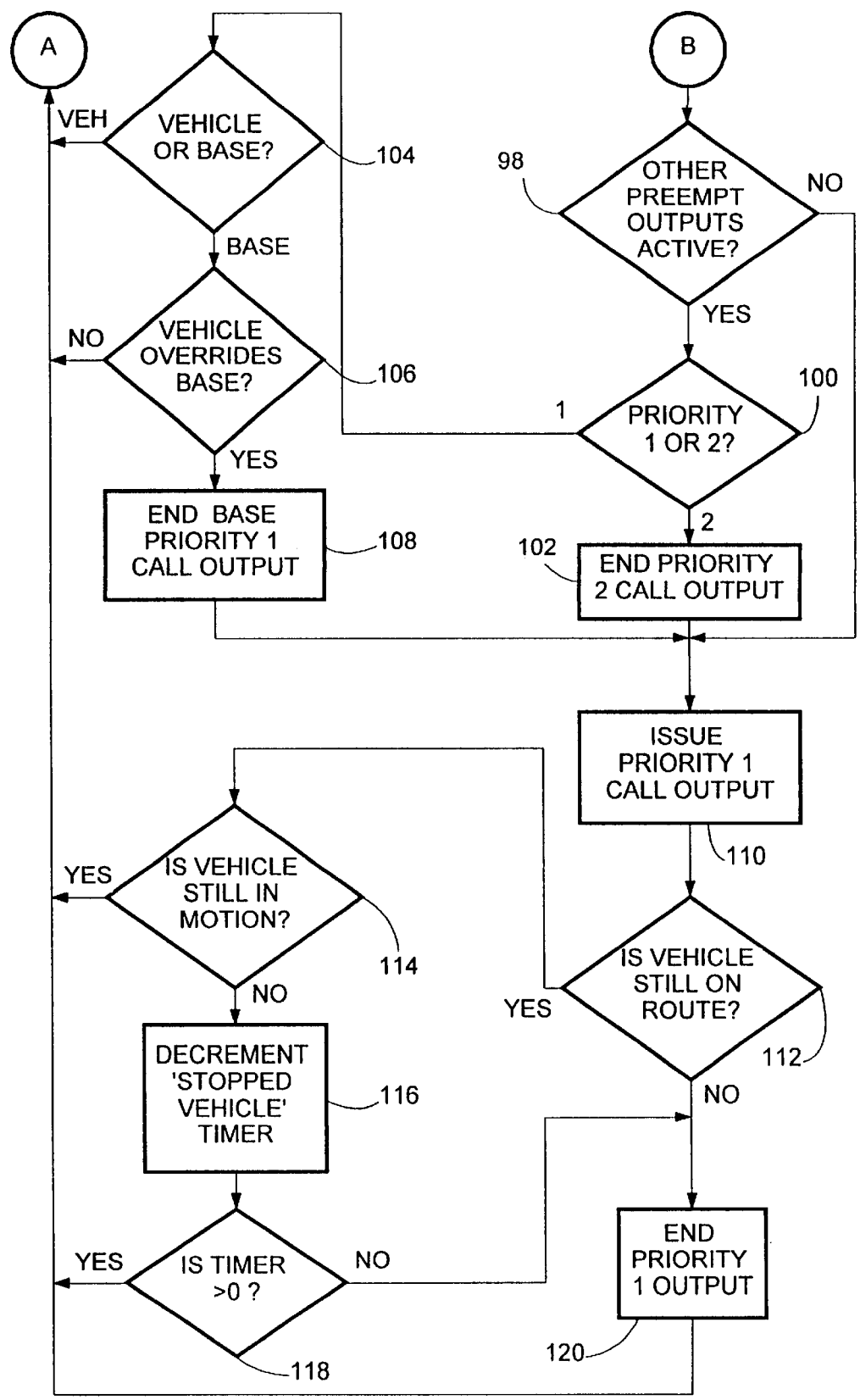
Figure 5C:
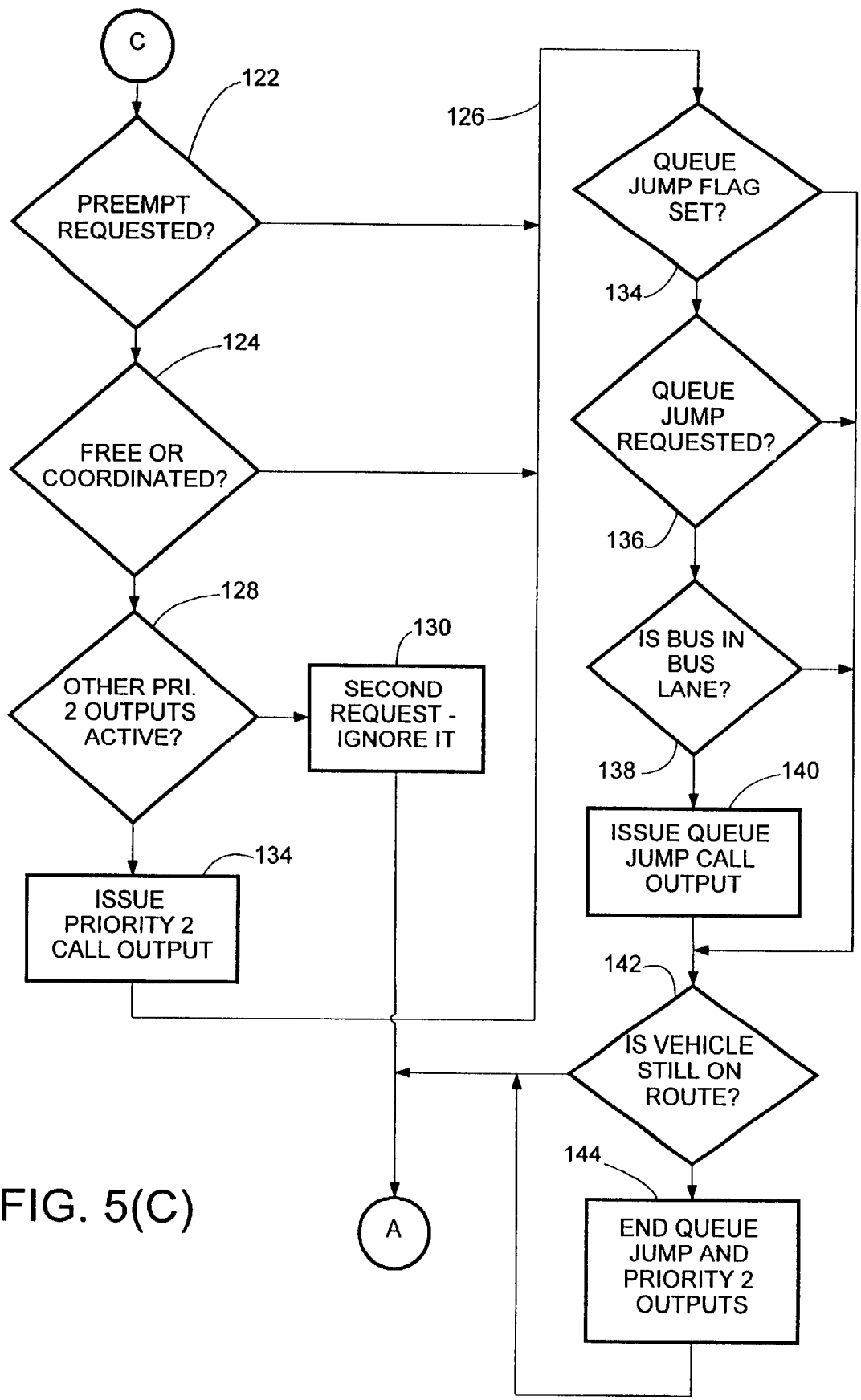

Operation of the intersection CPU 14I in its "run" mode can best be understood from the functional flow diagram of FIG. 5. In run mode, the intersection unit "listens" for signals from approaching vehicles, as indicated at 80. Upon detection of an approaching vehicle, the unit checks the incoming packet of data for validity, as indicated at 82. The validity of the system id., the agency id., the vehicle id. and the GPS data are all checked at this point. If the data is invalid in some respect, the logic flow returns to the listening mode of block 80. If valid data is received, the unit next checks to determine whether the data received is from a vehicle or from a base station, as indicated at 84. If from a base station, such as a nearby fire station, there is no need to determine GPS position and the ensuing few steps bypassed, as indicated by line 86. As indicated in block 88, the next step is to determine the vehicle position. As already discussed earlier in this specification, position determination involves use of an intersection GPS module 90, and correction of position measurement either in the vehicle or at the intersection unit, depending on the technique selected for implementation.

The next step is to match the GPS vehicle position with a predefined template of the route baseline through the intersection, as indicated at 92. Then a comparison is made to determine whether the vehicle position is within the discretionary preempt window or the mandatory preempt window, as indicated at 94. If not, the position is recalculated, by returning to block 88 in the flow diagram. At this point the logic determines whether the vehicle is an emergency vehicle or a bus, as indicated at 96. The functions performed in the case of an emergency vehicle will be described first.

For emergency vehicle processing, the intersection unit first determines, as indicated at 98, whether other preempt outputs are active, i.e. whether other vehicles have already triggered a preempt output signal. If other preempts are already active, the unit next determines, as shown at 100, the priority of the other preempt. If the existing preempt is for bus (priority 2), the unit ends the bus's preempt output, as indicated at 102. If the existing preempt is for another emergency, the unit next determines, as indicated at 104, whether the other emergency is from a vehicle or a base station. If the other emergency was also from a vehicle, the current preempt request is ignored and the unit resumes it listening mode. (The two vehicles compete on a first-come-first-served basis.) If the other emergency was from a base station, the unit next determines whether vehicles can override base emergencies, as indicated at 106. (This is a programmable option for the intersection.) If vehicles do not override base stations at this intersection, the unit resumes its listening mode and ignores the current preempt request. If vehicles can override base station emergencies, the base station preempt is terminated, as indicated in block 108. At this point, having addressed the question of prior existing preempt outputs and distinguished between vehicle and base station emergencies, the intersection unit is now ready to issue a priority-1 (emergency vehicle or base station) preempt output, as indicated at 110.

After issuing the preempt output, the unit next checks to see if the vehicle is still on the route, as indicated in block 112. As the vehicle approaches the intersection, its position is tracked by the intersection unit to determine if it is still within the preempt windows. If the vehicle is still on the route, a further check is made to see if the vehicle is still in motion, as indicated in block 114. If a vehicle stops for some reason, this condition will be detected by the intersection unit and the preempt output will be terminated. Blocks 116 and 118 indicate that a timer is used to time the how long the vehicle has been stopped. When a time limit is exceeded, the priority-1 preempt output is ended, as indicated at 120. The preempt output is also terminated when the vehicle exits the route by crossing the termination band, as determined in block 112.

Processing of preempt requests from buses are slightly different, as indicated in the lower-right portion of the flow diagram. First it is determined whether the bus is requesting a priority-2 preempt, as indicated at 122. If so, the next test, at block 124, is to determine whether the intersection is operating in a free-running or coordinated mode. "Coordinate" means that operation of the intersection is coordinated with other intersections. If the intersection is coordinated, some agencies may not allow priority-2 preemptions. If preempt has not been requested (block 122) or if the intersection is coordinated (block 124), issuing the priority-2preempt output is bypassed, as indicated by the line 126. Immediately before issuing the request, the unit checks for the existence of other priority-2 requests, as indicated at 128. If there are any, the current request is ignored, as indicated at 130 and the unit continues in the listening mode.

If all the foregoing tests are passed for the bus preemption request, a priority-2 preempt output is issued, as indicated at 132. The remaining portion of the logic diagram pertains to "queue jumps" by buses. At some intersections, buses may be provided with a queue jump lane at the right-hand edge of the route. A signal given to that lane only allows the bus to enter the intersection a few seconds before the rest of the traffic. The unit logic first checks a queue jump flag, as indicated at 134, to determine whether queue jumping is permitted at this intersection. If not, the queue jumping logic is bypassed. If the queue jump flag is set, the next test made is to determine whether a queue jump has been requested by the bus, as indicated at 136. If not, the remaining queue jump logic is bypassed. If the request has been made, a final check is made of the bus's position, to see that it is in the bus lane that will get the queue jump signal, as indicated at 138. If so, the queue jump output is issued, as indicated at 140. If not, the output is not issued.

Regardless of whether queue jumping is implemented, if a priority-2 preempt output has been issued, the unit continues to check, as shown at 142, whether the bus position is still on the route. If so, the logic continues looping as shown. When the bus leaves the route, by crossing the termination band, the priority-2 output and any queue jump output will be terminated, as indicated at block 144.

Figure 6:
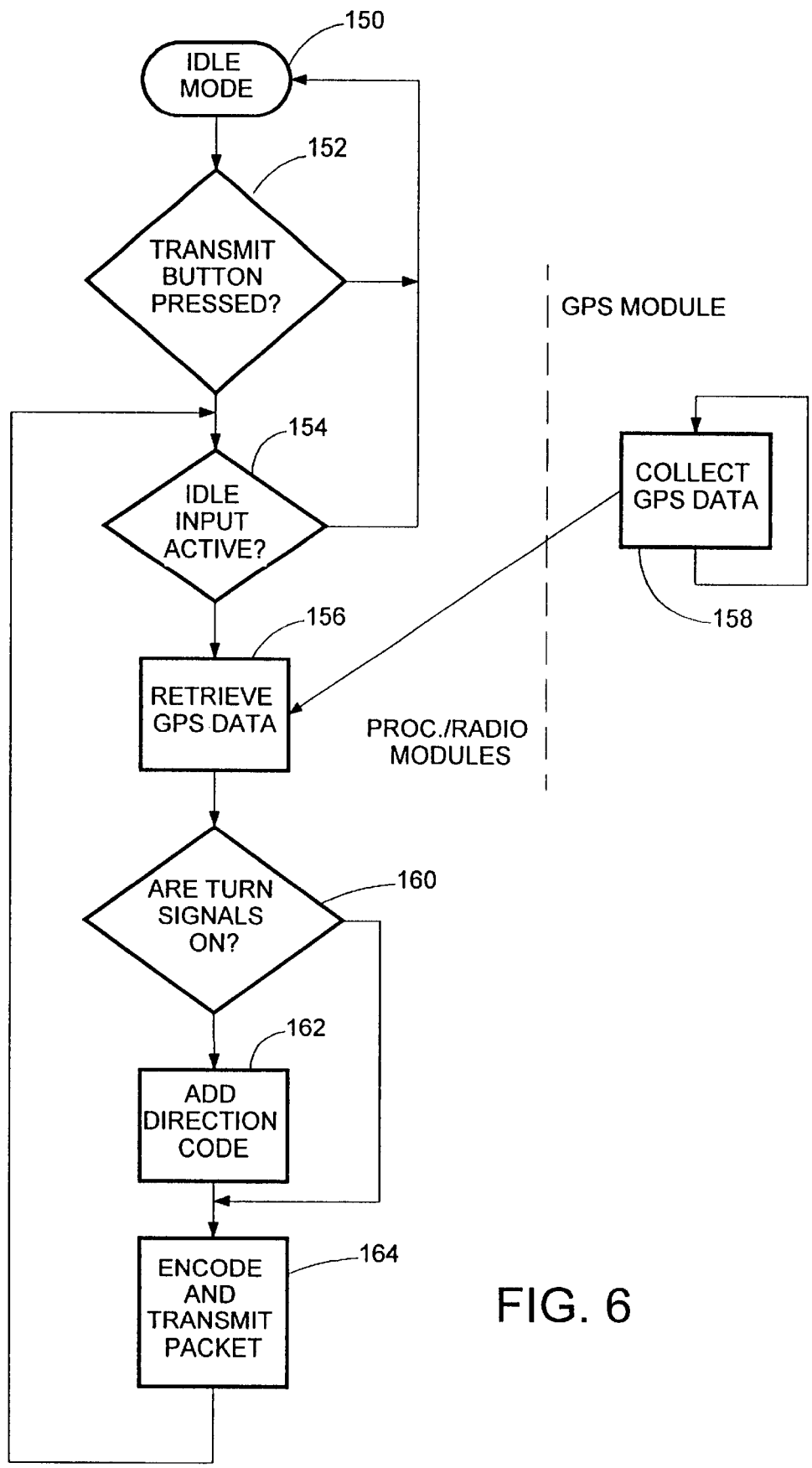
FIG. 6 is a flow diagram showing the functions performed by a vehicle subsystem in the "run" mode.

For completeness, FIG. 6 shows a similar flow diagram for operation of the vehicle subsystem, primarily the vehicle transmitter, in the "run" mode. The vehicle subsystem spends much of its time in an idle mode, as indicated at 150, checking for actuation of a transmit button, as indicated at 152, and checking whether an idle input is active, as indicted in block 154. An idle input is generated by some selected aspect of vehicle operation that would render the vehicle incapable of entering the intersection. For example, an idle input signal may be generated if the driver-side door of the vehicle is open. If the transmit button has not been pressed or if an active idle input is detected, the subsystem remains in the idle mode. Otherwise, GPS data are received from the GPS module, as indicated at 156. The GPS module collects GPS position data, as indicated generally at 158, but the flowchart has been simplified in the sense that it does not show the correction of GPS data based on information received from the intersection subsystem. If the turn signals are on, as indicated at block 160, a direction code is added to the data to be transmitted, as indicated at 162. Then a data packet is encoded and transmitted, as indicated at 164. The data packet from the vehicle includes the following elements:

System ID Code,
Agency ID Code,
Vehicle ID Code,
Priority (1 or 2),
GPS Data,
Anticipated turn direction code.

Figure 7:
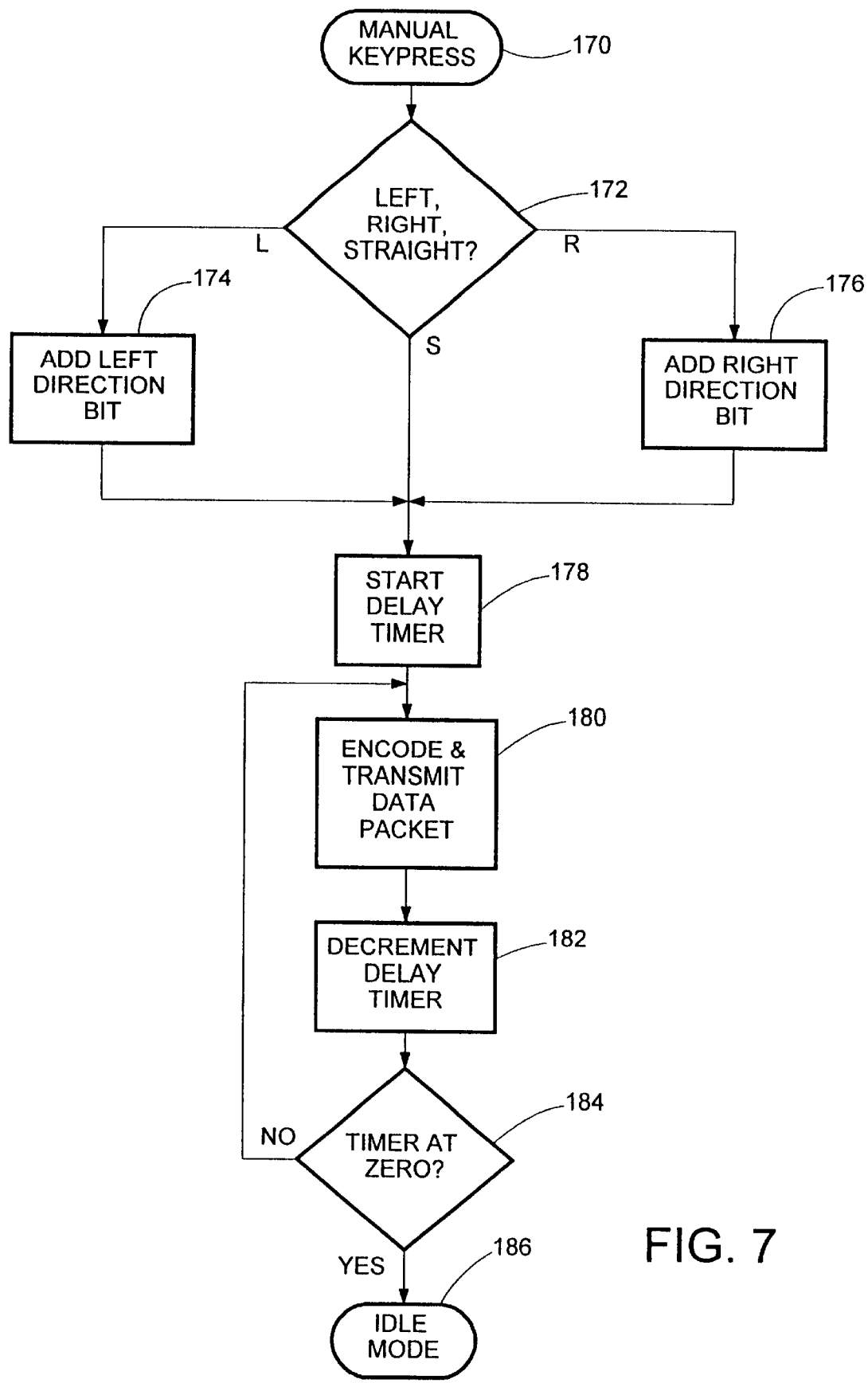
FIG. 7 is a flow diagram showing the functions performed by a base station subsystem in the "run" mode.

Operation of a base station transmitter is shown in FIG. 7. When a base station, such as a fire station located near a controlled intersection, is ready to request preemption, a manual key is pressed, as indicated at 170; then a direction change information is obtained, as indicated at 172. If a left or right turn is proposed, an appropriate bit is added to the data packet being prepared for transmission, as indicated at 174 and 176. Then a delay timer is started, as indicated at 178, and the data packet is encoded and transmitted, as indicated at 180. The delay timer is decremented, as indicated at 182, and checked for zero value in block 184. The packet is transmitted repeatedly until the delay timer has expired; then a return is made to the idle mode, as indicated at 186.

The data packet from the base station includes:

System ID Code,
Agency ID Code,
Station ID Code,
Base unit identifier,
Priority (1 or 2),
Anticipated turn direction code.

Preemption Utilizing Turn Signals:

Preemption systems prior to the present invention could only preempt intersections directly in front of the approaching vehicle. In areas where the intersections are located close to each other, false preemptions of intersections were common, and intersections to the left or right of a vehicle's path were not preempted in sufficient time to allow unimpeded passage of a turning emergency vehicle. An important aspect of the present invention is its ability to allow emergency vehicles to preempt an adjacent intersection to the left or right of the vehicle's direction of travel when preemption is first requested. This feature allows the vehicle to preempt a nearby adjacent intersection before arrival at the current intersection, thereby improving safety by clearing traffic in the path of the vehicle at the adjacent intersection. A related benefit is that adjacent intersections, in directions that the vehicle will not be travelling along, do not have their signals preempted unnecessarily. By preempting only those intersections that the vehicle will cross, the system reduces disruption of normal traffic at non-preempt intersections.

Figure 8:
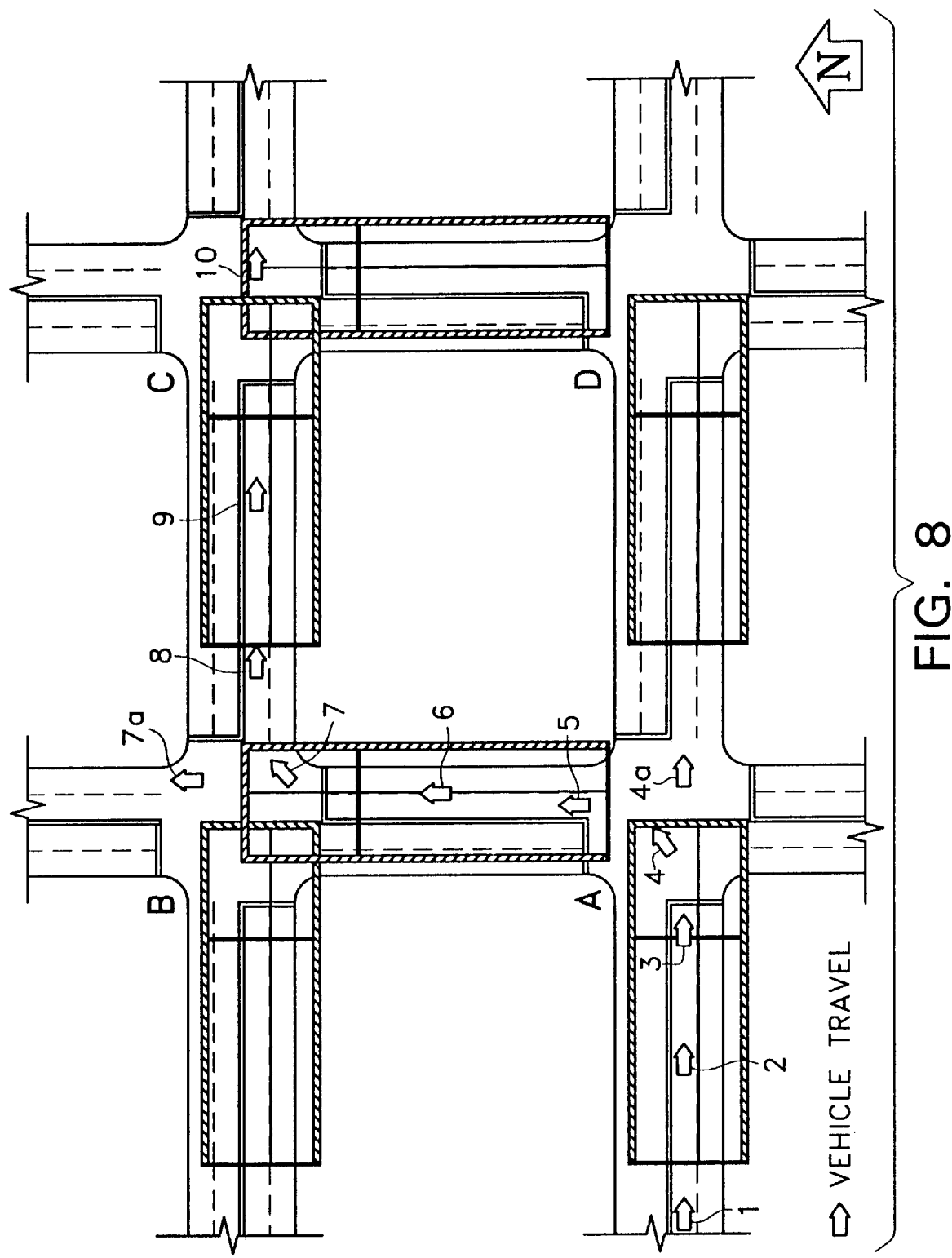
FIG. 8 is a simplified plan view of four closely spaced intersections, depicting operation of the preemption system of the invention when turn signals are utilized.

More specifically, operation of the system utilizing turn signal data is shown diagrammatically in FIG. 8, which depicts four closely spaced intersections A, B, C and D. An eastbound vehicle is approaching intersection A, as indicated at vehicle position #1. At vehicle position #2, intersection subsystem A issues an eastbound preempt output to the intersection controller. At vehicle position #3, the driver of the vehicle turns on his left-hand turn signal. The vehicle subsystem adds a left-turn bit to the transmitted data packet and this information becomes immediately available at the intersection subsystem.

At intersection B, which is located to the left of the vehicle as it approaches intersection A, the intersection subsystem (B) would normally ignore signals from the approaching vehicle because its direction of travel is eastbound and the vehicle is not within any of intersection B's preempt windows. However, because the data packet contains a left-turn bit, intersection subsystem B issues an early northbound preempt request when the vehicle is at position #4, i.e. just as it is making a left turn at intersection A. This preempt request would not normally occur until the vehicle reached positions #5 or #6 and only for a vehicle travelling in a northbound direction.

In addition, if the eastbound preempt route for intersection D (located east of intersection A) were to extend beyond position #4a in the figure, and overlap the mandatory preempt window of intersection A, then intersection D might issue an eastbound preempt output unnecessarily, since the vehicle would not reach intersection D. In the system of the invention, the left-turn bit transmitted by the vehicle would also be received by the intersection subsystem at D, alerting it to the fact that the vehicle is turning and does not need preemption at intersection D.

Similarly, a right-turn bit would be added to the transmitted data if the driver turned on the right-hand turn signal when approaching intersection B. This would cause the intersection subsystem at C (east of B) to issue an early eastbound preempt output.

Another important aspect of the invention is that because each intersection subsystem receives data pertaining to the vehicle's direction of travel, as contrasted with its intended direction of travel indicated by the turn signal, each intersection can provide preemption for an appropriate direction of travel. For example, when the vehicle reaches position #10 in intersection C, it will have crossed the termination band for the eastbound preempt route but will be within the mandatory preempt window for the northbound route. However, the intersection subsystem is aware that the vehicle is travelling east and not travelling north, so the intersection will not issue a northbound preempt for the vehicle.

Following is a description of a preferred embodiment of the invention. This description in various aspects relies upon, repeats and adopts much of the foregoing description.

This preferred embodiment uses a system having a traffic signal subsystem and a vehicle subsystem using configuration A(1) as discussed above and shown in FIG. 1.

The apparatus and method commences with installation at an intersection of a GPS receiver to perform a self survey.

This procedure takes place over a sufficient length of time to substantially cancel out the effects of SA. It is known that the SA induced error mean will approach zero if averaged long enough; a 40–48 hour survey produces nearly a mean zero data set. In other words, it provides a very accurate antenna position. Any other means could be used to provide the accurate antenna position for the intersection GPS antenna but the method used herein enables providing a self service integrated system for setting up the intersection. The resulting intersection antenna coordinates will typically be in the ECEF coordinate system. The system and method use an intersection centered coordinate system (ICCS) in which the antenna position is the center. Therefore the ECEF coordinates will be converted to the ICCS coordinates. For convenience that antenna position will be referred to as the intersection position or location or the known point or known location.

Next, the intersection subsystem is put into broadcast mode, receiving current GPS signals at its known location and sending out on the radio GPS pseudorange correction terms, including satellite-identification data for each such correction term. In this respect use of the technique known as pseudorange differential is preferred but the technique known as position differential could also be used, with appropriate changes in the system and method.

In order to use the system and method, a set-up procedure must be followed to make qualifying tracks for each approach path.

Now the system is ready to set up the intersection. A vehicle traveling approach paths into the intersection can get very good differential correction terms from the intersection subsystem.

The intersection subsystem accepts incoming signals from a vehicle as fast as they are sent. The intersection subsystem broadcasts differential corrections every 8–10 seconds in a stand-by mode. But, when it receives a vehicle message (from anywhere), the intersection subsystem goes into a turbo mode broadcasting corrections at a rate of every second or every other second, depending on how many satellites are being processed. These corrections are used for the set-up as well as for operation of the system.

First the programmed time of arrival (PTA) for the approach is determined. This is explained in greater Detail below. For the present steps it is sufficient to appreciate that the PTA is a time period which has been determined for the approach. It is an estimated amount of time that will be necessary, after preemption is requested to execute preemption phasing of the lights and to clear the intersection for the on-coming emergency vehicle. It takes into consideration time to reach a phase in the signal cycle which permits interruption and clearance of stored traffic.

In a vehicle, the vehicle subsystem is connected to a lap-top computer having a software program designated, MTPUTIL. One feature of the MTPUTIL is an "approach programming" feature, which is activated. To do the set-up the vehicle starts at either end of the approach path to conduct a set-up run. The operator, typically a traffic engineer, decides how far from the intersection is far enough for the set-up run. He must go at least far enough from the intersection to be clear of the selected PTA requirement for the approach. To do this a hypothetical top speed for an approaching vehicle is assumed. Its travel distance during the PTA time is the distance from the intersection which will be run for the set-up. A little greater distance may be selected to be sure because too much distance is of no consequence while too little would lose the optimum use of the system. By definition too little distance means that an actual emergency vehicle, after entering the approach track, could have an actual arrival time at the intersection sooner than the PTA for that approach path.

Next the system is put in "record" mode, the vehicle drives the path, and when through "stop" is selected.

In driving the path, the GPS unit (a GPS receiver/processor) in the vehicle computes and sends to the lap-top computer a line of positions in ECEF coordinates, which have corrected accuracy as provided by the pseudorange correction terms sent from the reference station of the intersection subsystem.

While driving the path the vehicle GPS unit sends its signals to the lap-top at selected intervals, one second (1 Hz) being a common interval. In this way, if the vehicle is traveling at 40 miles per hour, the coordinates will be about 60 feet apart. In some cases, such as a straight path, it will only be necessary to use the beginning and end points. In fact for intersections which have perpendicular approaches, along substantially straight paths, a universal template can be created for use on such intersections, although different PTA periods would usually be used. Also, if the path has highly discrete turns in it between straight paths such as a 90° sharp turn, it might be possible to record only the turn point. This will be better appreciated from the following explanation.

An important part of this process deletes bad points resulting from bad GPS reception. The quality of the navigation accuracy from the satellite reception can be estimated from certain data including "residuals" and the latency of the differential corrections. This is based on a horizontal figure of merit (Hfom) applied to each reading, so that if the reading is good-within a selected figure of merit limit, it is used or if the reading is bad- outside the selected figure of merit limit, it is omitted. The figure of merit is measured in meters and ranges from 1 to about 300; preferably less than 10.

The Hfom is the GPS engine's best estimate of the worst possible error in its position solution given the information error in its position solution given the information available to it at that specific time. It does not mean that the position solution is actually that far off, it could be "dead on".

Therefore, a high Hfom could be considered as a "low level of confidence" in the current position.

The method then uses the GPS line of positions to define a series of contiguous polygons along the path. Generally the polygons will have four sides and four corners but as will be seen a degenerate case can result in a triangle with two of the corners being in the same place. To create the polygons for a particular path a best linear fit curve fitting technique is used. The purpose of the technique is to seek to provide polygons extending over more than two points of the line of positions and to include the maximum permissible number of the points. In that technique a line is established to pass by or through a number of the points, that is, it traverses a number of the points. Generally it is desired to have a line which will acceptably traverse as many points as possible. That line will be the centerline of the polygon, and the points at each end will define the end line segments of the polygon. Except for the case of two points, the line will miss some or all of the points by some distance, thus having an error of fit of the line to the points. Therefore an error tolerance is selected. This is the perpendicular distance from the line to a point. Selection of the error tolerance therefore, in most cases will limit the number of points which can be included in the best linear fit because usually as more points in a curve are taken in, the fit error increases.

The error tolerance is selected based on how precisely a curve needs to be reproduced. This depends on how sharp the curve is and how close are any adjacent roadways which need to be excluded from the approach track. The best linear fit procedure is implemented in the software in the lap-top in the vehicle. The goal is to contain as many points as possible in a best linear fit line that keeps each point a distance at or less than the fit error tolerance.

Figure 9:
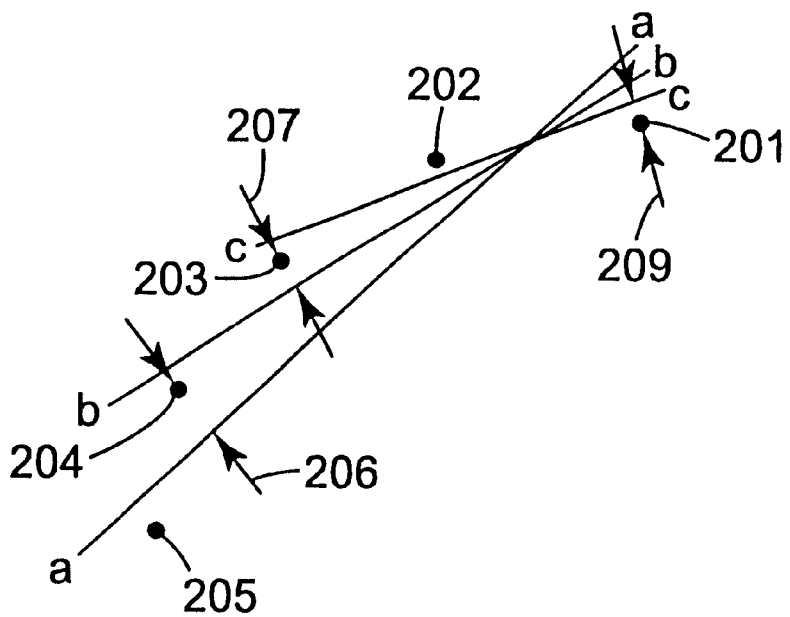
FIG. 9 diagramatically shows the curve fitting technique.
Figure 10:
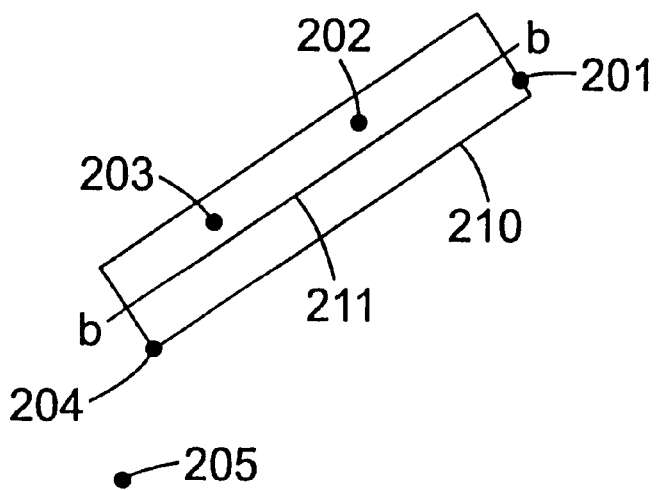
FIG. 10 diagramatically shows a polygon created around a set of points.

This is illustrated in FIGS. 9 and 10. Referring to FIG. 9, Points 201, 202, 203, 204, and 205 have been fixed by the GPS receiver and sent to the computer containing the MTPUTIL program. They define a curve. A fit error tolerance is selected by the operator and input to the program, which then performs the curve fitting procedure. Line a—a is tried through all of the points 201, 202, 203, 204 and 205, but it is not selected because its greatest error at 206 is greater than the fit error tolerance. Line b—b is tried and will ultimately be selected, going through points 201, 202, 203 and 204 because its error 207 is equal to or less than the fit error tolerance and it traverses the most points. Line c—c will go through points 201, 202 and 203 with its greatest error 209 less than x. Although it qualifies because the error is less than the error tolerance, it will not be selected because another qualifying line, b—b traverses more points. Thus in this case, referring to FIG. 10, a polygon 210 will be established from point 201 to point 204, excluding point 205. The line b—b will be the centerline 211 through a polygon extending along the track from Point 201 to Point 204, although those points may not be on the line.

By defining the position fixes to be included in the polygons, longitudinal ends of the polygons and their centerlines have been defined. Next, the lateral extremities are defined. An arbitrary baseline polygon width of 10 meters being proposed. This gives a baseline polygon having a 10 meter wide track which is consistent with road lane widths. The user can move the lateral lines of any polygon in and out depending on how the approach was driven. For example, if driven down the center of the road, the baseline distance can be made 5 meters to each side. If the road was driven near a right or left extremity, then the width can be adjusted, closer along one side and further out along the other side. Other factors can influence selection of the placement of the lateral segments such as proximity of another roadway that has to be excluded. The left and right sides can be adjusted by the operator together, or separately.

Figure 11A:
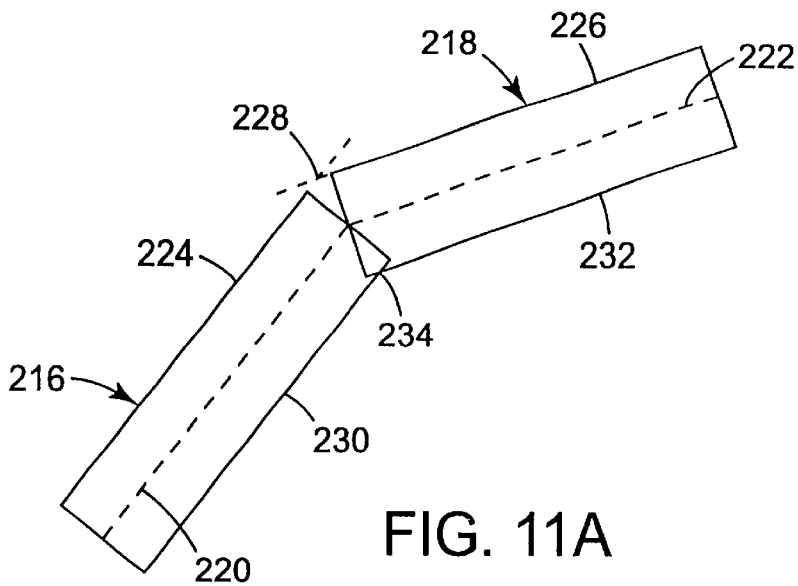
FIG. 11A diagramatically shows two adjacent polygons created around a set of points.
Figure 11B:
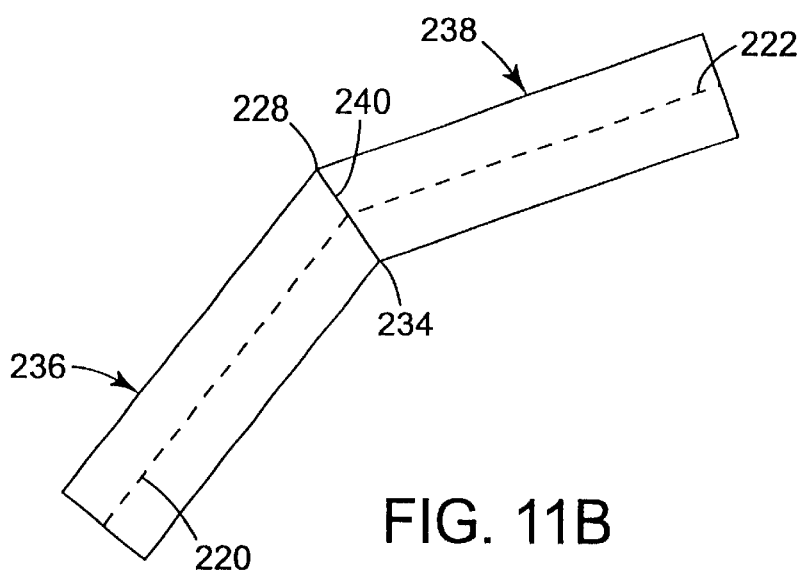
FIG. 11B diagramatically shows the two polygons of FIG. 11A in which adjacent line segments are made common.

As adjacent polygons are established they do not have a common end line, as shown in FIG. 11A. The program fixes this by extending or shortening the lateral segments to a cross-point. This is illustrated in 11A, where polygons 216 and 218 have been defined having midlines 220, and 222 respectively, where lines 224 and 226 have a crosspoint 228 and lines 230 and 232 have a cross-point 234. The final segments 236 and 238 are shown in FIG. 11B, note that the line 240 is a common line for polygons 236 and 238, extending from crosspoint 228 to crosspoint 234.

Figure 12:
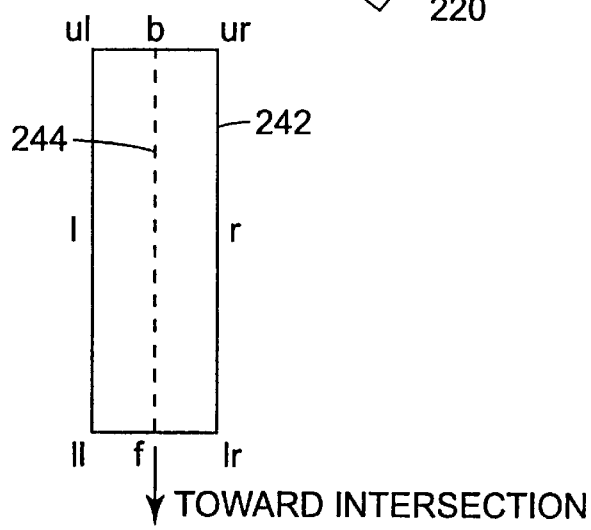
FIG. 12 diagramatically shows the intersection and line segment identification for a polygon.

In the MTPUTIL program, as seen in FIG. 12 the line segments of the sectors are assigned codes as back, "b", front, "f", left side, "l" and right side, "r". The segments are defined by their intersection end points, also assigned codes as upper left, "ul", upper right, "ur", lower left, "ll" and lower right, "lr". The midline is shown at 224. Once the polygons are set they can be referred to as sectors, and the procedure can be called sectoring. The polygons or sectors are preferably quadrilaterals, more preferably rectangles, except in the degenerate case where it becomes a triangle.

After the sectors are defined for each approach, they define an approach track or qualified track. If the path of travel of an equipped emergency vehicle is within the track, preemption will be allowed to be implemented subject to the other requirements being met.

This preferred embodiment uses a polygon shape, either a single polygon or a series of contiguous polygons to define the approach track or qualified track. However, other geometric shapes to define an enclosed geometric area or zone could be used, for example, the lateral segments could be curved, such as by following a curvature established by the line of position fixes.

In the present system and method, two other important elements of GPS derived information for the vehicle are used. These are direction of travel and speed of travel. Also, turn signal status is used. These will be discussed in further Detail below, having also been discussed above.

One of the objectives of establishing the track is to be able to measure the length of the path from the vehicle at any position fix to the intersection, because, as will be seen, the distance from a subject vehicle to the intersection is a crucial although indirect part of the time of arrival concept. This is measured by adding the length of the sector midlines such as 244 in FIG. 12 and 220 and 222 in FIG. 11B. So, for curves, the smaller the sector length, the more accurate will be the distance measure. This is controlled by selection of the error tolerance. Small errors in the travel distance measurement have been found not to affect performance of the system. An operator can try several set-ups, displayed on the screen, to choose the sectoring which best fits the situation on the ground. After the sectoring and tracks are selected the actual ground layout is no longer relevant.

When the approach tracks for the intersection are completed, in the lap-top, they are sent to the computer in the intersection subsystem ready to be used. This can be done through a direct data transfer port or through a radio port. In the preferred system and method, up to 12 approach tracks can be present for an intersection. The position fixes are not transferred to the intersection, only the corners that define the sectors and the midlines, and certain other lines as will be explained below. These are all stored as vectors and distances from the known point.

The tracks are preferably converted from the ECEF coordinate system to an intersection centered coordinate system (ICCS) based on the intersection center point as described above.

Now operation of the system and method is described.

Traffic control deals with time. All control functions are performed in a timed cycle having the various phases of the lights in the cycle. The phases of a cycle are composed of timed intervals. There are NEMA (National Electrical Manufacturers Association) standards which prohibit interruption of certain timed intervals, so that preemption can only be implemented at allowed points in the cycle. The NEMA standards are not legally mandated, but the presently preferred system uses those standards. Also, there is additional time needed for clearing traffic ahead of the requesting vehicle. A typical preempt will establish all green in the direction of travel and stop all other traffic.

The present system and method is based on a concept called time of arrival matching. The time of arrival matching concept is now described.

First, for each approach to the intersection a programmed time of arrival (PTA) is established. This is a time period in seconds which, once established, will always be used and is selected as the maximum time required to create a clear condition in the intersection for the approach path. The PTA is a worst case condition because it will assume the longest reasonably possible time for the traffic controller to allow preemption. It is a human decision based on and to some extent dictated by traffic control rules and traffic engineering concepts.

A single PTA is selected which takes into account the worst case condition, that is, the largest time period to allow all cycling requirements to occur plus time to clear stored traffic. For example, a PTA might be 29 seconds. This time period is programmed into the intersection computer.

A brief description of a phase of a control cycle is helpful. There are NEMA standards which set some of the requirements. An example of the timed intervals and times might be:

8 seconds minimum green *

2 vehicle extension 30 maximum green 4.5 vehicle clearance *

8 pedestrian walk 14 pedestrian clearance *

2 all red clearance

The timed intervals shown by * cannot be violated by preemption, because under the NEMA standards they must be allowed to complete. So, as an example to select the PTA:

8 seconds minimum green (and pedestrian walk) just starts before the preemption request arrives.

14 pedestrian clearance must be allowed 4.5 vehicle clearance must be allowed 26.5 the worst case condition, cannot preempt for 26.5 seconds if the signal is given to preempt at that point in the cycle.

If NEMA standards were not used, and it was decided that some intervals could be interrupted, then a shorter worst case condition could be implemented.

Then, there is another time issue. The system has to clear stored up traffic. This has been studied and time periods concluded depending on how many vehicles are assumed to be in line. In the example, presume that to get the last stored vehicle clear of the intersection will require 20 seconds. This part of the decision involves a human judgement respecting how much traffic is presumed. For each approach once the judgement is made it is put into the computer to be used as part of the PTA for that approach.

Therefore, in this example, 46.5 seconds is the PTA for that approach. It means that the system must be set up so that the reasonably presumed fastest moving vehicle (this is another human judgement) will set off a preemption activation when it is 46.5 seconds or less away from the intersection. The speed of a vehicle in an actual preempt operation doesn't change the situation at the intersection subsystem, the PTA is fixed. As mentioned earlier, the approach track will extend far enough that the presumed fastest traveling vehicle will be in the approach track when it is 46.5 seconds away from the intersection.

A key element of the system is to receive the vehicle's speed along the path. The length of the path from the vehicle to the intersection is also calculated each time the signal is processed. The path length is the combined length of the sector midlines from the vehicle to the intersection. From that information a dynamic estimated time of arrival for the vehicle (VETA) is calculated. The VETA is the computed time period at each position fix that will elapse for the vehicle to get to the intersection. Of course this will vary with the vehicle's speed and will change as the vehicle progresses along the path.

Consequently, at each reception at the intersection from the vehicle, the vehicle's speed over the path is calculated and its VETA is calculated. When the VETA is equal to or less than the PTA, the intersection module will implement a preemption signal to the traffic controller. Of course any predetermined relationship between the PTA and the VETA could be used. Also, any other qualification for preemption must be satisfied.

Typically, when first read, the VETA will be greater than the PTA. The system does not respond to this. But at some point VETA is equal to or less than PTA or at whatever is the selected relationship. That is when the intersection module sends a preemption request signal to the traffic controller. Thus the physical point "on the ground" where the vehicle will be at the time the preemption signal sent varies. In effect, there is no designated point on the path for a preempt request to be implemented, instead there is a matching of VETA and PTA.

Since PTA is the largest time it could take to implement a preempt, faster moving vehicles will cause the preemption to be requested further away from the intersection and slower moving vehicles will cause it to happen closer to the intersection.

The outer boundary of the line of sectors, that is the one furthest away from the intersection has been selected to account for the highest reasonably possible speed. This ensures that a very fast moving vehicle will be in the approach track when the VETA-PTA time match occurs. The furthest end of a sector away from the intersection is called the maximum preempt point. If the vehicle is any further away it is not in the approach track and can't qualify for preemption. Similarly, if a vehicle is outside the lateral boundaries of the track it cannot qualify for preemption. Still, there may be, and in the preferred embodiment are, other qualifications.

From the time the vehicle crosses the maximum preempt point, there can be a preempt request signal to the traffic controller if and when the vehicle's speed along the path and distance from the intersection establish a VETA which matches or is less than the PTA (or meets any other fixed predetermined relationship).

As seen above, because the worst case condition is selected for PTA, the intersection should be clear when the vehicle gets there. If less than the worst case is in effect, the intersection will clear well ahead of the arrival of the vehicle.

Of course, many variables, such as the reaction of drivers of stored-up traffic, can interfere with the desired result. Nevertheless, the system allows implementation of known traffic engineering knowledge which to some extent appreciates driver reactions.

In the present system and method, to obtain preemption, that is for the intersection subsystem to send a preemption request signal to the controller, in addition to being in the approach track and having time match, the vehicle has to be moving, and it has to be moving toward the intersection. These latter requirements are met by requiring that the vehicle have a component of its speed along the path which is greater than its component of speed at a right angle to the path. If the vehicle is stationary or not moving toward the intersection, then no preemption signal will be sent from the intersection module to the traffic controller even if the vehicle is in an approach trak Then, the system has also to deal with a slow moving vehicle that perhaps will never (except very close) have a VETA short enough to match the PTA. Such a vehicle will get to the traffic long before the preemption is in effect, and then it may have to stop in traffic, frustrating the system. Therefore, a boundary is established called the Minimum Preempt Point. The Minimum Preempt Point is a selected specified distance from the intersection. When the vehicle reaches the Minimum Preempt Point a preemption request signal will be given even if the VETA is still longer than the PTA, (or any other selected relationship is not satisfied) allowing traffic to clear.

The Minimum Preempt Point is a human judgement based on such factors as traffic volume, lane width and traffic flow source. An exemplary Minimum Preempt Point for a single intersection might be about 200–300 meters. It disregards vehicle speed and its VETA. This is intended to deal with a slower moving vehicle, for example if icy conditions are present. The vehicle may reach the Minimum Preempt Point prior to achieving time matching of VETA and PTA This is an override of the time matching requirement.

In the present system and method, the vehicle has to be moving toward the intersection. A stationary vehicle or one not moving toward the intersection cannot qualify for preempt. To take care of a vehicle which might be crossing the road or moving away, the vehicle speed component directly toward the intersection must be equal to or greater than its speed component at a right angle to the direction of travel. Actually the system does this using the sector midline as a coordinate for the direction toward the intersection. So, to qualify as moving toward the intersection the component of speed along or parallel to the sector midline must be equal to or greater than the speed component at right angle to the sector midline. If this criteria is not met, the vehicle will not be considered as approaching the intersection and it cannot qualify for preemption.

The full content of the signal sent from the vehicle to the intersection is:

Vehicle identification data such as agency I.D. and vehicle-specific I.D.;

Corrected GPS derived data;

Turn signal left or right, if present

Therefore, to obtain the end result, preemption, the vehicle equipment must confirm a qualified I.D., it must show a position on one of the approach tracks, it must be moving toward the intersection and it must meet the VETA-PTA matching rule or alternatively the Minimum Preemption Point has been reached.

Normally, preemption will give a green light to pass through an intersection. Also, it is advisable to give green arrows such as a left turn arrow. This is known to be helpful to clear the left turn lane in case the through traffic does not clear. Traffic engineering appreciates that drivers will often not clear a through lane, but will more often clear a left turn lane. If the left turn lane is clear the emergency vehicle can pass through even if the through lanes are still blocked. To ensure that this will work, the approach sector should include the left turn lane.

As described previously, the system and method recognize a left or right turn signal from the vehicle to activate a subsequent intersection to the left or right as the case may be. To do this the immediate intersection subsystem recognizes the turn signal and in response broadcasts a message to be received by the subsequent intersection. That message contains a "fake" location (preferably the intersection known location) and motion of the vehicle so as to place it on a qualified approach to and moving toward the subsequent intersection Consequently, it can be appreciated that this is intended to operate when the subsequent intersection is fairly close to the immediate intersection so that the approach track of the subsequent intersection will run across the immediate intersection so that the fake known location signal places the vehicle on the approach track of the subsequent intersection.

Preemption is terminated after the vehicle passes a point designated in the intersection, as referred to previously, as the termination band. It is the end of the stored approach track nearest the intersection; the closer end of the sector nearest to the intersection. It is a line deliberately selected and stored. Termination is removal of the activation signal by the intersection computer to the traffic controller. When this happens the traffic controller is released to resume its normal phasing. Upon the first vehicle position received by the intersection subsystem which is across the termination band, the preemption request will be dropped.

When a preempt is in effect, more than one emergency vehicle could pass through comfortably, if they are close enough. But, if they are some distance apart, the first vehicle will activate termination, and since the second vehicle will not have reached VETA-PTA matching or the Minimum Preempt Point, normal phasing will begin. This creates a problem of stored-driver confusion with having an intersection preempted, then released for a short period of time, then preempted again. It is preferable to hold the first preempt.

To do this, a "hold for next vehicle" procedure is implemented. To do this a hold time is programmed, such as 10 seconds. This means if the second vehicle is away from VETA-PTA time match by the hold time, or less, that is 10 seconds or less, the preempt will be held. Also, if the second vehicle is away from the Minimum Preempt Point by a selected programmed distance or time then the preempt will also be held. In the MTPUTIL program if these selections are set to zero, then the hold for next vehicle procedure will be inoperative.

The present system and method also takes into account the problem of a stopped vehicle. As explained above, a vehicle not moving toward the intersection does not qualify for preemption. This would include a stopped vehicle. But some stopped vehicles should qualify for preemption. For example, if the stopped traffic does not clear, or for whatever reason, the vehicle has to stop, the vehicle still wants and should have preemption. On the other hand, some stopped vehicles do not need preemption, such as if the emergency stop is in the approach track. To cure this problem a programmable stopped vehicle timer is set up in the intersection computer. If the intersection subsystem detects no vehicle motion for the selected time period, it drops the preemption call to the controller and the controller returns to normal cycles. Also, a second timer is in the vehicle subsystem. It is not selectively programmable but instead has a fixed time period which is longer than the time selected in the intersection stopped vehicle timer. An exemplary preferred time for the second timer is two minutes. After the two minutes of no vehicle movement, the vehicle subsystem will stop sending signals. If the intersection timer has failed, the absence of position signals from the vehicle for a fixed period, such as 10 seconds, will cause the preemption call to be dropped. The primary timer at the intersection and the back-up secondary timer in the vehicle prevent locking the intersection into a preempt phase if the vehicle operators fail to turn off the system. The vehicle will preferably be equipped with a door switch on the driver's door which will turn off the unit when the driver's door is opened. Therefore, without signals coming in, after the last signal time elapses, the preempt request will be terminated.

Another operational function comes into effect when a new vehicle which is not moving sends signals. In this case, the system has never detected this vehicle in motion. If it is in the approach track when the first signals are received, but beyond (further away from the intersection) the Minimum Preempt Point, there will be no preempt. If it is inside the Minimum Preempt Point, then preempt will be allowed. This is the only time that a preemption request will be issued for a stationary vehicle. It is intended to account for the following scenario. An emergency vehicle that is not on an emergency run is stopped at a signalized intersection when it receives a call to respond to an emergency incident. The vehicle immediately turns on his siren and light which in turn activates the vehicle preemption subsystem, sending signals to the intersection which would qualify for preemption but for not moving toward the intersection because the vehicle is blocked on all sides by stopped traffic. At this point the vehicle is stationary, the vehicle subsystem is transmitting its position but the intersection subsystem has not been tracking the vehicle. Therefore, if the vehicle suddenly appears to the intersection subsystem inside of the Minimum Preempt Point a preempt request will be issued to the controller to clear out the traffic and allow the emergency vehicle to proceed.

Figure 15:
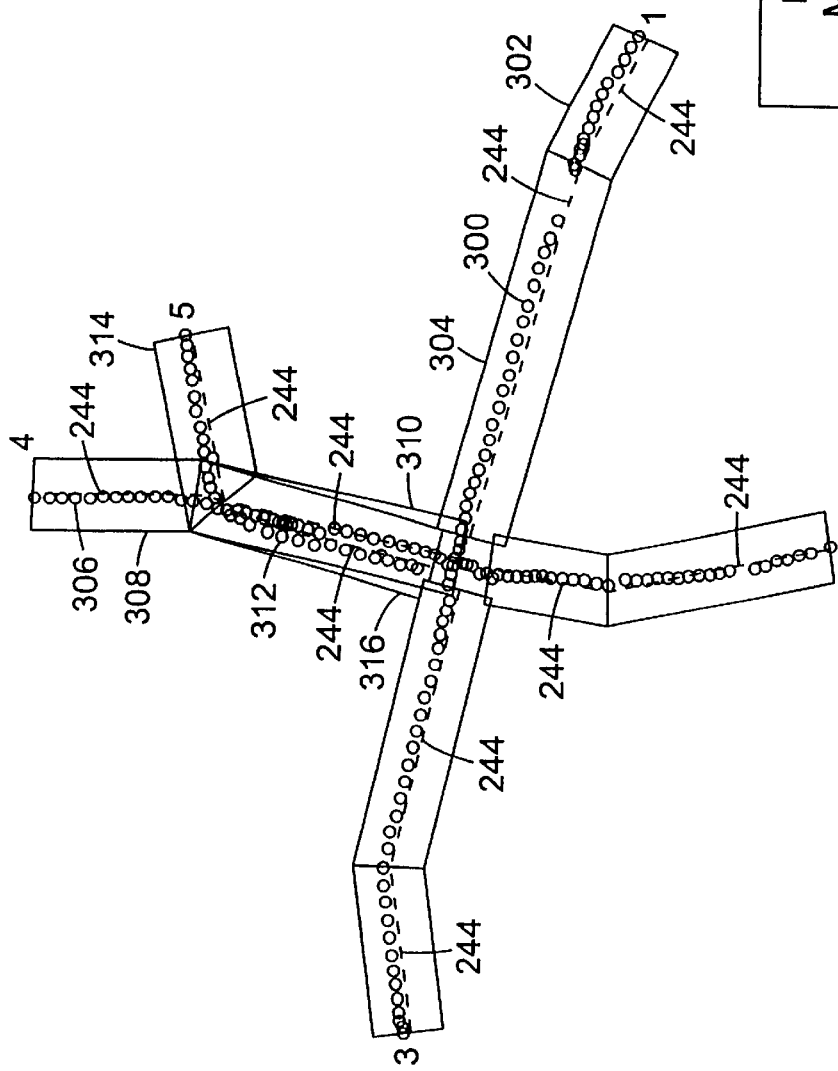
FIG. 15 is a reproduction of a screen showing an intersection set up in the MTPUTIL program.

A set of the screens from the MTPUTTL program as shown as FIGS. 13, 14 and 15. A more complete set of screens is in Appendix III.

FIG. 13 is an exemplary Approach Programming screen. The intersection has 5 approaches. Approach 1 was driven on the right side; 47 position points were recorded. The low horizontal figure of merit (Low Hfom) was 3.50 and the high horizontal figure of merit (High Hfom) was 14.40. The figure of merit is an estimate of the worst possible error for that fix. If the high Hfom is 30 or more, usually the approach will be re-run If the high Hfom is 15 or more, the program will drop that position from the record. These figures of merit limits are selected and can be changed. The Satellite Info gives Integrity which is the limit of Hfom used for the run; Satellites, which is the number of GPS satellites being tracked, and Hfom which is the actual horizontal figure of merit for each position fix as it is being recorded. Intersection info is the position of the known point. Sectors counts the number of sectors; Appr's counts the number of approaches. Keying instructions are in the box at the bottom.

FIG. 14, the Intersection Data Screen, is displayed from keying F9 of FIG. 13. Referring to Approach 1, it has a Minimum Preempt time of 30 seconds and distance of 820 feet. It has a Standing Que Extension of 20 seconds, and 945 feet. It has a Hold for Next Vehicle of 10 seconds and 472 feet, a Direction Trip Point of 656 feet and a Lost Signal Timeout of 10 seconds.

These mean:

Minimum Preempt:
Time: The PTA selected for the approach.
Distance: The programmable parameter for Minimum Preempt Point for each approach path.

Standing Que Extension:
Time: The continuous occupancy time of a traffic detector.
Distance: If there are traffic detectors in operation which report continuous occupancy for a selected number of seconds (Time) then it is concluded that traffic is backed up, so an earlier preempt will be needed. Therefore the Time will be added to the PTA and the Distance will be added to the Minimum Preempt Distance.
Input: Which input pin is being used.
Hold for Next Vehicle: If there is a second vehicle not yet qualified for preempt, the Time is added to the PTA and if there is a match, the preempt will be held and the distance is added to the Minimum Preempt Distance.
Direction Trip Point: The maximum distance from the center of the first intersection that the vehicle must reach before the first intersection subsystem will start broadcasting that the vehicle is going to turn left or right if its corresponding directional signals are being used. This feature allows the preemption of closely spaced traffic signals around corners in the anticipated direction of the turn.

Lost Sig Timeout:
If signal from the vehicle to the intersection is lost for a selected time such as 10 seconds, the preempt call will be dropped. This is because the vehicle may have reached the scene in the approach, and opened a door. There may be a transmitter problem. It prevents locking up the intersection.

Unit Output:
This is the pin on which is output the signal to the traffic controller, typically a ground true output to the controller.

Figure 16:
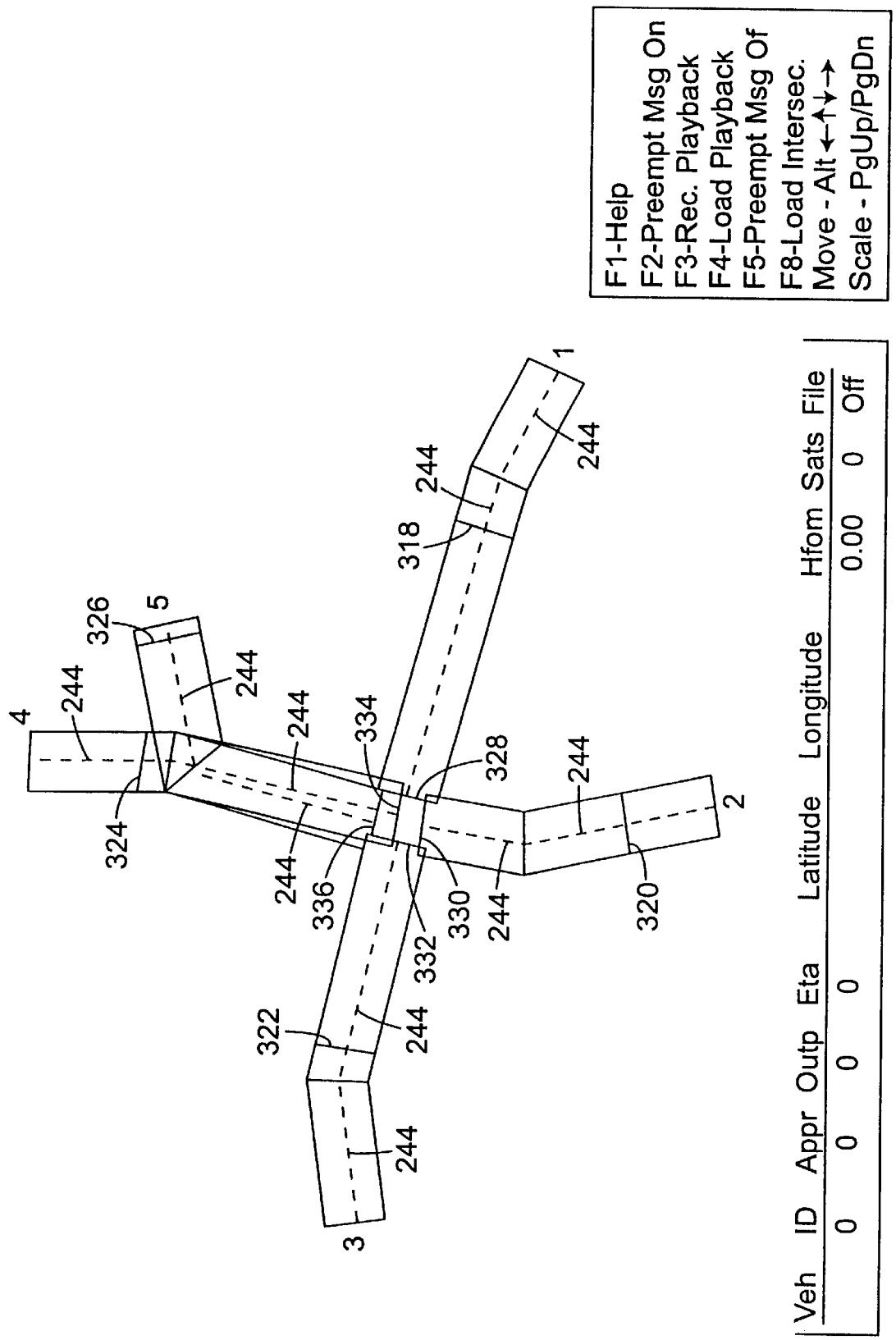
FIG. 16 is a reproduction of a screen showing the intersection which was set up as in FIG. 15 as stored in the intersection computer.

FIGS. 15 shows the approach tracks to an intersection as shown on the lap top screen. The small circles are corrected GPS positions calculated in the vehicle during set-up These can also be shown as "x"s. FIG. 16 shows the same intersection as recorded in the intersection computer.

FIG. 15 shows that the sector's lateral limits were established 35 feet to the left of the midline and 25 feet to the right of the midline (facing toward the intersection), a total sector width of 60 feet. The approaches are numbered 1, 2, 3 and 4. Approach 1 has a line of position fixes 300, and two sectors 302 and 304. Approach 4 also has a line of position fixes 306 and two sectors 308 and 310. Approach 5 is a street that comes into Approach 4. It is set up independently having a line of position fixes 312 and two sectors 314 and 316. The midlines 244 are shown. Approaches 4 and 5 could use common sectors where they overlap.

Referring to FIG. 16, the approach sectors are shown as sent to the intersection. The position fixes are not sent to the intersection. In addition to the sector boundaries, the Minimum Preempt Positions are shown as 318, 320, 322, 324 and 326. Also, the termination points are 328, 330, 332, 334 and 336. The midlines 244 are also shown. These are the same as the near ends of the closer sectors.

Figure 17:
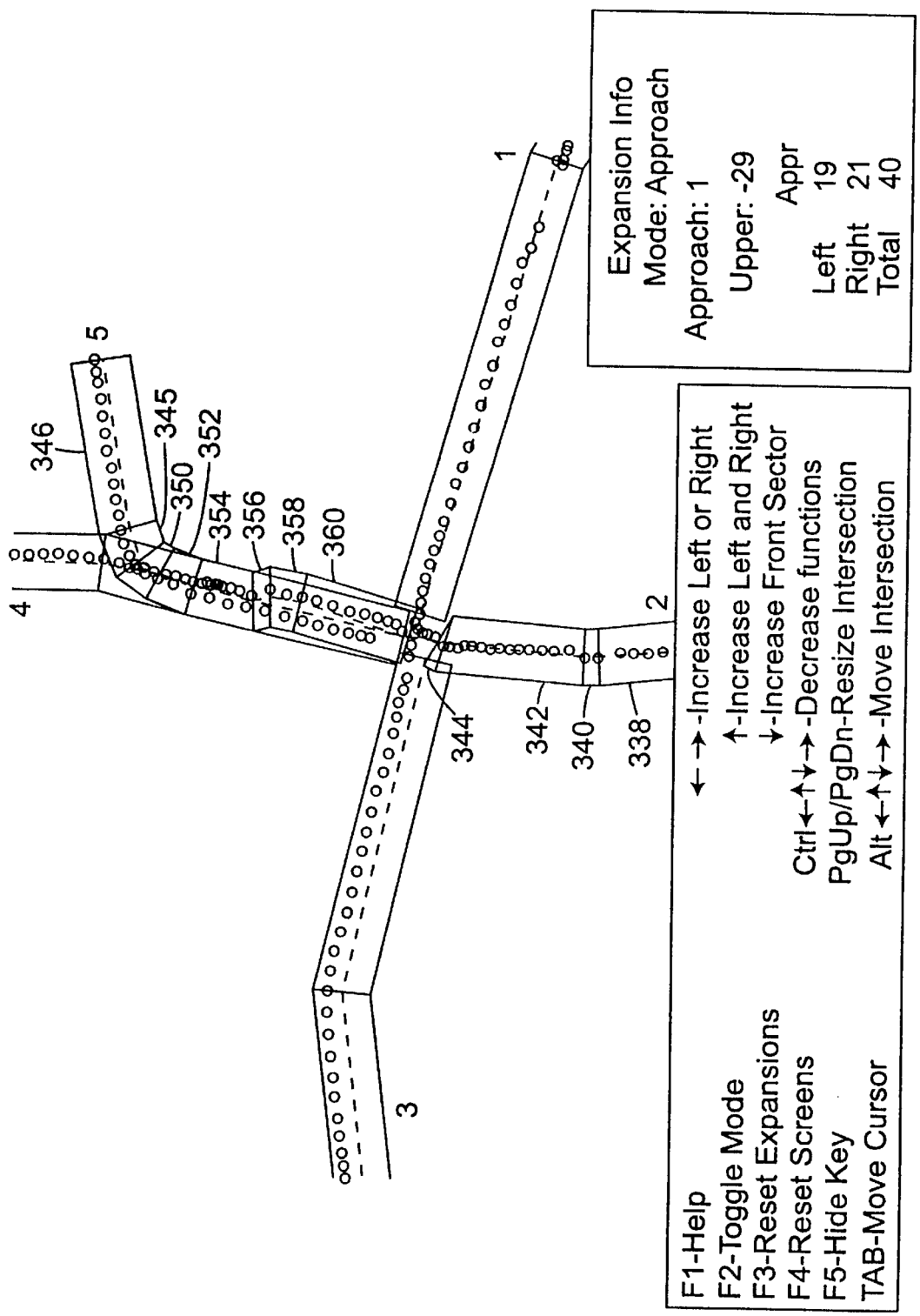
FIG. 17 is a reproduction of a screen showing the intersection set up of FIG. 15 in the MTPUTIL program with modifications.

FIG. 17 shows the effect of varying the fit error tolerance, as compared to FIG. 15. The fit error tolerance has been reduced. Consequently, curves that were previously not recognized with separate sectors have now produced additional sectors. This is seen in Approach 2 where there are now four sectors 338, 340, 342 and 344. Note that sector 344 is a triangle demonstrating the degenerate case of adjacent polygons where the corners have merged. Also Approach 5 now has 8 sectors; 346, 348, 350, 352, 354, 356, 358 and 360.

Figure 18:
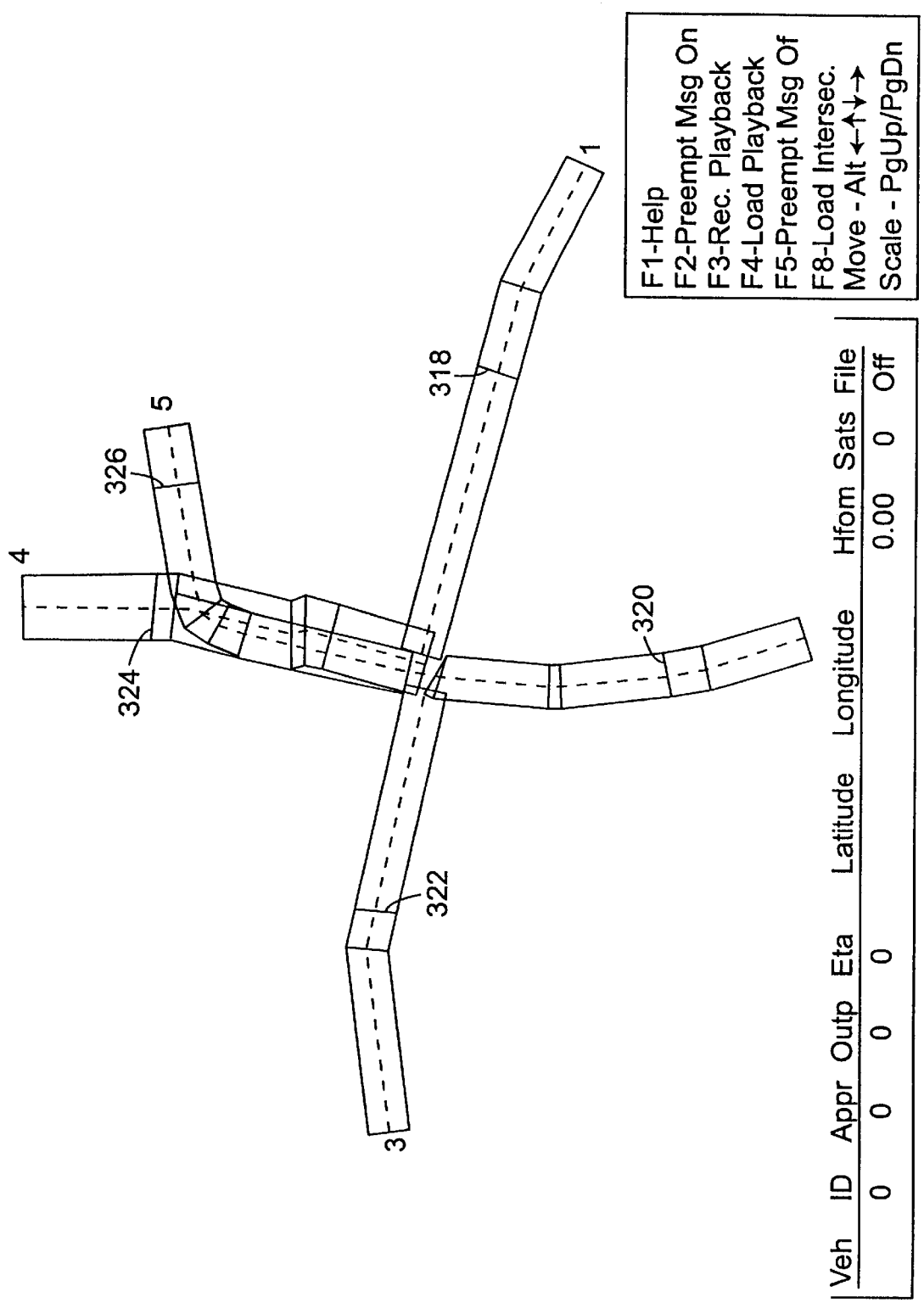
FIG. 18 is a reproduction of a screen showing the intersection which was set up in FIG. 17 as stored in the intersection computer.

FIG. 18 shows how the modified approaches of FIG. 17 are stored in the intersection computer, and that the Minimum Preempt Points 318, 320, 322, 324 and 326 are still seen. In addition, a further modification has been implemented in the lap-top before this was sent to the intersection computer. That further modification is that the sectors of Approach 4 have been widened. This illustrates the flexibility of the system to define approaches to enable a vehicle to stay on the approach even it if moves laterally, such as into an opposing traffic lane. Also, on an approach, some sectors could have different lateral spacing than other sectors. A sector could be narrowed to omit a nearby road that does not approach the intersection.

The content of the following appendixes are incorporated into this description. The appendixes are:

Appendix - I MTP PRIORITY ONEgps Emergency Vehicle Traffic Preemption System Operators Manual Appendix - II MTP PRIORITY ONEgps Emergency Vehicle Traffic Preemption System Owners Manual Appendix - III MTPUTTL COMPUTER PROGRAM LISTING
Part A Screens
Part B Listings Appendix IV TECHNICAL SPECIFICATION FOR GPS & RADIO BASED TRAFFIC SIGNAL PREEMPTION SYSTEM FOR EMERGENCY VEHICLES Appendixes I, II, III and IV are protected by copyright laws, provided however that a copy of those appendixes may be made as part of and for the purpose of making a copy of this patent or of the USPTO file for this patent In an embodiment of the invention the GPS engine is an L1, C/A code only 12 channel receiver processor, the Canadian Marconi, Northstar, Allstar 12 being exemplary.

Conclusion

It will be appreciated from the foregoing that the present invention represents a significant advance in the field of traffic signal preemption for emergency vehicles. In particular, the invention uses accurate position, speed and direction measurements to preempt normal traffic control at an intersection without any disruption of traffic. It will also be appreciated that, although a number of related embodiments of the invention have been described in detail for purposes of illustration, other modifications may he made without departing from the spirit and scope of the invention. Accordingly, the invention should not be limited except as by the appended claims.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A method for traffic signal preemption for a vehicle traveling on an approach to a signalized intersection having a traffic signal controller, comprising:

(a) periodically determining the estimated time of arrival of the vehicle at the intersection (VETA);

(b) establishing a selected time period defining a time of arrival (PTA) for the approach;

(c) periodically comparing the VETA to the PTA using a predetermined relationship; and (d) sending a preemption request to the traffic signal controller requesting preemption when said predetermined relationship is satisfied and any other qualifications for preemption have been satisfied.

2. The method of claim 1, wherein the VETA is determined using information from GPS signals.

3. The method of claim 2, wherein the GPS-derived information is transmitted from a vehicle subsystem to an intersection subsystem and the comparison of the VETA and the PTA is done by the intersection subsystem.

4. The method of claim 1, wherein the VETA is determined using differential GPS.

5. The method of claim 1, wherein the preemption request is sent by a vehicle.

6. The method of claim 5, wherein the preemption request includes data indicative of the system ID code, the agency ID code, the Vehicle ID code, priority, GPS data, and the vehicle's anticipated turn direction.

7. The apparatus of claim 5, wherein the preemption request includes data indicative of the system ID code, the agency ID code, the Vehicle ID code, priority, GPS data, and the vehicle's anticipated turn direction.

8. The method of claim 1, wherein the preemption request is sent by a base station.

9. The method of claim 8, wherein the preemption request includes data indicative of the system ID code, the agency ID code, the station ID code, the base unit identifier, the priority, and the anticipated turn direction code.

10. The method of claim 1, wherein a vehicle subsystem also transmits to an intersection subsystem a signal indicating if a left or right turn signal of the vehicle has been turned on.

11. The apparatus of claim 1, wherein the preemption request is sent by the vehicle.

12. The apparatus of claim 1, wherein the vehicle subsystem also transmits to the intersection subsystem a signal indicating if a left or right turn signal of the vehicle has been turned on.

13. A traffic preemption apparatus for traffic signal preemption for a vehicle approaching a signalized intersection having a traffic signal controller, comprising:

(a) an intersection subsystem comprising:
(i) a programmed computer having stored in it an approach track for each approach to the intersection for which preemption is desired and having stored in it a selected time period (PTA) for each such approach;
(ii) a receiver to receive signals from a vehicle subsystem;
(iii) a signal circuit to the traffic controller to send requests; and (b) a vehicle subsystem comprising:
(i) sensors for obtaining data for periodically determining the estimated time of arrival of the vehicle at the intersection (VETA); and
(ii) the vehicle subsystem sending either the data or the periodically determined VETA to the intersection subsystem where the intersection computer either computes the VETA or uses the received VETA and compares the VETA to the PTA and, if a specified predetermined relationship is satisfied, authorizing traffic preemption.

14. The apparatus of claim 13, wherein the VETA is determined using information from GPS signals.

15. The apparatus of claim 14, wherein the VETA is determined using differential GPS.

* * * * *

UNITED STATES PATENT AND TRADEMARK OFFICE
CERTIFICATE OF CORRECTION

PATENT NO. : 6,243,026 B1
DATED : June 5, 2001
INVENTOR(S) : Jones, Gary V.

It is certified that error appears in the above-identified patent and that said Letters Patent is hereby corrected as shown below:

Column 4,
Line 21, delete "vehicle. the" and insert -- vehicle. The --.

Column 9,
Line 2, under the "Remarks" section, for the "Configuration" (B), delete "intereection" and insert -- intersection --.

Column 15,
Line 9, delete "2preempt" and insert -- 2 preempt --.

Column 23,
Line 43, delete "PTA" and insert -- PTA. --.

Column 24,
Line 24, delete "intersection" and insert -- intersection. --.

Column 25,
Line 24, delete "re-run" and insert -- re-run. --.

Column 26,
Line 47, delete "set-up" and insert -- set-up. --.

Column 27,
Lines 37-40, delete the entire lines beginning with "Appendixes I", on line 37 and ending with "patent" on line 40.

Signed and Sealed this

Sixth Day of May, 2003

JAMES E. ROGAN
*Director of the United States Patent and Trademark Office*